United States Patent
Dasler et al.

(10) Patent No.: US 11,614,332 B2
(45) Date of Patent: Mar. 28, 2023

(54) SYSTEMS FOR GENERATING INDICATIONS OF TRAVERSABLE PATHS

(71) Applicant: Adobe Inc., San Jose, CA (US)

(72) Inventors: Philip Charles Dasler, La Vernia, TX (US); Sana Malik Lee, Brea, CA (US); Jennifer Anne Healey, San Jose, CA (US)

(73) Assignee: Adobe Inc., San Jose, CA (US)

( * ) Notice: Subject to any disclaimer, the term of this patent is extended or adjusted under 35 U.S.C. 154(b) by 189 days.

(21) Appl. No.: 17/125,636

(22) Filed: Dec. 17, 2020

(65) Prior Publication Data

US 2022/0196405 A1 Jun. 23, 2022

(51) Int. Cl.
*G01C 21/20* (2006.01)
*G01C 21/00* (2006.01)
*H04W 4/024* (2018.01)

(52) U.S. Cl.
CPC ......... *G01C 21/206* (2013.01); *G01C 21/383* (2020.08); *H04W 4/024* (2018.02)

(58) Field of Classification Search
CPC .... G01C 21/206; G01C 21/383; H04W 4/024
See application file for complete search history.

(56) References Cited

U.S. PATENT DOCUMENTS

| | | | |
|---|---|---|---|
| 10,796,358 B1* | 10/2020 | Ducrou | G06Q 30/0639 |
| 11,079,245 B1* | 8/2021 | Niewiadomski | G01C 21/3492 |
| 2009/0072999 A1* | 3/2009 | Yu | G01C 21/365 |
| | | | 340/907 |
| 2013/0231889 A1* | 9/2013 | Hrybyk | G01C 22/006 |
| | | | 702/141 |
| 2015/0094094 A1* | 4/2015 | Rochberger | G01C 21/206 |
| | | | 455/456.3 |
| 2015/0133091 A1* | 5/2015 | Baldwin | H04W 64/006 |
| | | | 455/414.1 |
| 2016/0267618 A1* | 9/2016 | Baek | H04W 4/46 |

(Continued)

OTHER PUBLICATIONS

"22MILES Interactive Digital Signage Software", 22 Miles, Inc. Website [retrieved Feb. 12, 2021]. Retrieved from the Internet <https://www.22miles.com/digital-signage-solutions/interactive-displays/>., 2007, 10 pages.

(Continued)

*Primary Examiner* — Hunter B Lonsberry
*Assistant Examiner* — Harrison Heflin
(74) *Attorney, Agent, or Firm* — FIG. 1 Patents

(57) ABSTRACT

In implementations of systems for generating indications of traversable paths, a computing device implements a navigation system to receive map data describing a map of a physical environment that includes a destination, locations of display devices and relative orientations of the display devices in the physical environment. The navigation system forms a navigation graph by representing the destination and the locations of the display devices as nodes of the navigation graph and connecting the nodes with edges that indicate traversable path segments in the physical environment. Request data is received describing a request for navigation to the destination and a source of the request. The navigation system generates indications of a traversable path to the destination for display by the display devices based on the navigation graph and the relative orientations of the display devices.

20 Claims, 11 Drawing Sheets

(56) References Cited

U.S. PATENT DOCUMENTS

| | | | | |
|---|---|---|---|---|
| 2017/0089709 A1* | 3/2017 | Marusco | | G01C 21/206 |
| 2017/0115123 A1* | 4/2017 | Kang | | H04W 4/023 |
| 2017/0116783 A1* | 4/2017 | Huang | | G01C 21/365 |
| 2018/0089749 A1* | 3/2018 | Biermann | | H04W 4/029 |
| 2018/0126271 A1* | 5/2018 | Katzir | | H04W 4/33 |
| 2018/0143025 A1* | 5/2018 | Kurata | | G01C 21/005 |
| 2019/0215660 A1* | 7/2019 | Slushtz | | G01S 19/393 |
| 2021/0025727 A1* | 1/2021 | Barnes | | G06T 19/006 |
| 2021/0080262 A1* | 3/2021 | O'Shea | | G06F 3/0488 |
| 2021/0333114 A1* | 10/2021 | Roggenkamp | | G01C 21/3682 |
| 2022/0044337 A1* | 2/2022 | Sato | | G05D 1/0276 |
| 2022/0128376 A1* | 4/2022 | Sawada | | G01C 21/3667 |

OTHER PUBLICATIONS

"Are my beacons compatible with Estimote Monitoring?", Estimote Community Portal, Estimote, Inc. [retrieved Feb. 17, 2021]. Retrieved from the Internet <https://community.estimote.com/hc/en-us/articles/115001903611-Are-my-beacons-compatible-with-Estimote-Monitoring->., 4 pages.

"Dijkstra's algorithm", Wikipedia, the free encyclopedia [retrieved Feb. 12, 2021]. Retrieved from the Internet <https://en.wikipedia.org/wiki/Dijkstra%27s_algorithm>., 13 pages.

"Estimote—experts in location and proximity solutions", Estimote, Inc. Website [retrieved Feb. 17, 2021]. Retrieved from the Internet <https://estimote.eom/#custom>., 2012, 6 pages.

"Eyedog US", Intraprise Solutions, Inc., eyedog.us Website [retrieved Feb. 12, 2021]. Retrieved from the Internet <https://eyedog.us/>., 2013, 14 pages.

"Mobile Gaming Benchmarks", GameAnalytics, Instights Hub [retrieved Feb. 11, 2021], Retrieved from the Internet <https://gameanalytics.com/reports/mobile-gaming-industry-analysis-h1-2019>., Jun. 2019, 34 pages.

"NavVis M6", NavVis Website [retrieved Feb. 15, 2021]. Retrieved from the Internet <https://www.navvis.com/m6>., Apr. 2018, 11 pages.

"SoleWay", Ghent University, SoleWay Website [retrieved Feb. 12, 2021], Retrieved from the Internet <https://soleway.ugent.be/simplified>., 2017, 4 pages.

"What is a beacon protocol? Can beacons broadcast multiple packets simultaneously?", Estimote Community Portal, Estimote, Inc. [retrieved Feb. 17, 2021], Retrieved from the Internet <https://community.estimote.com/hc/en-us/articles/208546097-What-is-a-beacon-protocol-Can-beacons-broadcast-multiple-packets-simultaneously->., 4 pages.

Ahmetovic, Dragan et al., "NavCog: A Navigational Cognitive Assistant for the Blind", MobileHCI '16: Proceedings of the 18th International Conference on Human-Computer Interaction with Mobile Devices and Services [retrieved Feb. 11, 2021]. Retrieved from the Internet <http://www.cs.cmu.edu/~kkitani/pdf/AGKITA-MHCI16.pdf>., Sep. 2016, 9 pages.

Al-Ammar, Mai A. et al., "Comparative Survey of Indoor Positioning Technologies, Techniques, and Algorithms", 2014 International Conference on Cyberworlds [retrieved Feb. 11, 2021]. Retrieved from the Internet <https://www.researchgate.net/profile/Ahmad_Alnafessah/publication/, 288484594_Comparative_Survey_of_Indoor_Positioning_Technologies_Techniques_and_Algorithms/links/5b9936caa6fdcc59bf8c9cdf/Comparative-Survey-of-Indoor-Positioning-Technologies-Techniques-and-Algorithms.pdf>., Oct. 2014, 8 pages.

Alavi, Hamed et al., "Future of Human-Building Interaction", CHI EA '16: Proceedings of the 2016 CHI Conference Extended Abstracts on Human Factors in Computing Systems [retrieved Feb. 19, 2021]. Retrieved from the Internet <https://www.researchgate.net/publication/302074317_Future_of_Human-Building_Interaction>., May 2016, 8 pages.

Alavi, Hamed S. et al., "Introduction to Human-Building Interaction (HBI): Interfacing HCI with Architecture and Urban Design", ACM Transactions on Computer-Human Interaction, vol. 26, No. 2 [retrieved Feb. 19, 2021]. Retrieved from the Internet <https://dl.acm.org/doi/pdf/10.1145/3309714>., Mar. 2019, 10 pages.

Arthur, Paul et al., "Wayfinding: People, Signs, and Architecture", McGraw-Hill, Incorporated, New York, NY, 1992.

Ashton, Kevin, "That 'Internet of Things' Thing", RFID Journal [online] [retrieved Feb. 19, 2021]. Retrieved from the Internet <https://www.rfidjournal.com/that-internet-of-things-thing>., Jun. 22, 2009, 6 pages.

Atzori, Luigi et al., "The Internet of Things: A survey", Computer Networks, vol. 54, No. 15 [retrieved Feb. 19, 2021]. Retrieved from the Internet <https://pdfs.semanticscholar.org/170e/e9747962f781dfcc6d89705f05c0c30fd4e8.pdf>., Oct. 2010, 19 pages.

Braun, Virginia et al., "Using thematic analysis in psychology", Qualitative Research in Psychology, vol. 3, No. 2 [retrieved Feb. 22, 2021]. Retrieved from the Internet, <https://www.researchgate.net/profile/David_Morgan19/post/How_do_I_select_relevant_codes_in_Inductive_content_analysis/attachment/59d644c9c49f478072ead741/AS:273819455950855@1442295053090/downl oad/Braun+06+Thematic+Analysis.pdf>., 2006, 26 pages.

Brock, Anke et al., "FlyMap: Interacting with Maps Projected from a Drone", PerDis '18: Proceedings of the 7th ACM International Symposium on Pervasive Displays [retrieved Feb. 22, 2021]. Retrieved from the Internet <https://hal-enac.archives-ouvertes.fr/hal-01800780/file/perdis-flymap.pdf>., Jun. 2018, 10 pages.

Brooke, John, "SUS—A quick and dirty usability scale", Usability evaluation in industry 189, 1996, 7 pages.

Butz, Andreas et al., "A Hybrid Indoor Navigation System", IUI '01: Proceedings of the 6th international conference on Intelligent user interfaces [retrieved Feb. 22, 2021], Retrieved from the Internet <http://citeseerx.ist.psu.edu/viewdoc/download?doi=10.1.1.32.994&rep=rep1&type=pdf>., Jan. 2001, 8 pages.

Chang, Yao-Jen et al., "Comparing picture and video prompting in autonomous indoor wayfinding for individuals with cognitive impairments", Personal and Ubiquitous Computing, London, vol. 14, No. 8 [retrieved Mar. 4, 2021]. Retrieved from the Internet <https://link.springer.com/article/10.1007/s00779-010-0285-9>., Dec. 2010, 11 pages.

Clément, Alexandre R. et al., "Bridging the gap between performers and the audience using networked smartphones: the a. bel system", Proceedings of the International Conference on Live Interfaces 2016 [retrieved Feb. 22, 2021]. Retrieved from the Internet <https://pdfs.semanticscholar.org/d1a2/4370760fe32e0c9302bc26419c3d4e79cf04.pdf>., Jul. 2016, 7 pages.

Clinch, Sarah, "Smartphones and Pervasive Public Displays", IEEE Pervasive Computing, vol. 12, No. 1 [retrieved Feb. 22, 2021]., Retrieved from the Internet <https://www.researchgate.net/profile/Sarah-Clinch-3/publication/260359320_Smartphones_and_Pervasive_Public_Displays/links/5b5f3ce50f7e9bc79a6f470a/Smartphones-and-Pervasive-Public-Displays.pdf>., Jan. 21, 2013, 4 pages.

Coenen, Jorgos et al., "Synchronized Wayfinding on Multiple Consecutively Situated Public Displays", PerDis '16: Proceedings of the 5th ACM International Symposium on Pervasive Displays [retrieved Feb. 22, 2021]., Retrieved from the Internet <http://universaldesignaustralia.net.au/wp-content/uploads/2016/06/Synchronized-Wayfinding-on-Multiple-Consecutively-Situated-Public-Displays.pdf>., Jun. 2016, 15 pages.

De Cock, Laure et al., "Comparing written and photo-based indoor wayfinding instructions through eye fixation measures and user ratings as mental effort assessments", Journal of Eye Movement Research, vol. 12, Iss. 1 [retrieved Feb. 12, 2021]. Retrieved from the Internet <https://biblio.ugent.be/publication/8600754/file/8600758>., Jan. 9, 2019, 14 pages.

Dedes, George et al., "Indoor GPS Positioning—Challenges and Opportunities", VTC-2005-Fall. 2005 IEEE 62nd Vehicular Technology Conference vol. 1. IEEE, 2005 [retrieved Feb. 22, 2021]. Retrieved from the Internet <http://citeseerx.ist.psu.edu/viewdoc/download?doi=10.1.1.367.4023&rep=rep1&type=pdf>., Sep. 2005, 4 pages.

Dethlefs, Nina et al., "Evaluating Task Success in a Dialogue System for Indoor Navigation", Aspects of Semantics and Pragmatics of Dialogue. SemDial 2010, 14th Workshop on the Semantics and Pragmatics of Dialogue [retrieved Feb. 22, 2021]. Retrieved from the Internet, <https://www.researchgate.net/profile/Kai-Florian_

(56) References Cited

OTHER PUBLICATIONS

Richter/publication/228727946_Evaluating_task_success_in_a_dialogue_system_for_indoor_navigation/links/0fcfd506a983bde23a000000.pdf>., Jun. 2010, 4 pages.

Dijkstra, E. W., "A Note on Two Problems in Connexion with Graphs", Numerische Mathematik 1 [retrieved Feb. 22, 2021]. Retrieved from the Internet <https://ir.cwi.nl/pub/9256/9256D.pdf>., Dec. 1959, 3 pages.

Downs, Roger M. et al., "Maps in Minds: Reflections on Cognitive Mapping", Harper & Row, Jan. 1977.

Evans, Dave et al., "How the Next Evolution of the Internet Is Changing Everything", The Internet of Things, Cisco White Paper [retrieved Feb. 22, 2021]. Retrieved from the Internet <https://www.cisco.eom/c/dam/en_us/about/ac79/docs/innov/IoT_IBSG_0411_FINAL.pdf>., Apr. 2011, 11 pages.

Fallah, Navid et al., "Indoor Human Navigation Systems: A Survey", Interacting with Computers, vol. 25, No. 1 [retrieved Feb. 22, 2021]. Retrieved from the Internet <http://citeseerx.ist.psu.edu/viewdoc/download?doi=10.1.1.919.6263&rep=rep1&type=pdf>., Sep. 2012, 13 pages.

Fisher, R.A., "Statistical Methods for Research Workers", Edinburgh Olivers Boyd LTD., Edinburgh: Tweeddale Court, London [retrieved Feb. 22, 2021]. Retrieved from the Internet <http://haghish.com/resources/materials/Statistical_Methods_for_Research_Workers.pdf>., Feb. 1925, 336 pages.

Fixova, Katerina et al., "In-hospital navigation system for people with limited orientation", 2014 5th IEEE Conference on Cognitive Infocommunications (CogInfoCom) [retrieved Feb. 23, 2021]. Retrieved from the Internet, <https://www.researchgate.net/profile/Miroslav-Macik/publication/272086709_In-hospital_navigation_system_for_people_with_limited_orientation/links/579b192e08ae425e491a14dc/In-hospital-navigation-system-for-people-with-limited-orientation.pdf>., Nov. 2014, 6 pages.

Freeman, Linton C. et al., "A Set of Measures of Centrality Based on Betweenness", Sociometry, vol. 40, No. 1 [retrieved Feb. 23, 2021], Retrieved from the Internet <http://moreno.ss.uci.edu/23.pdf>., Mar. 1977, 7 pages.

Giannopoulos, Ioannis et al., "GazeNav: Gaze-Based Pedestrian Navigation", MobileHCI '15 Proceedings of the 17th International Conference on Human-Computer Interaction with Mobile Devices and Services [retrieved Feb. 23, 2021], Retrieved from the Internet, <https://www.researchgate.net/profile/Ioannis-Giannopoulos-3/publication/278024934_GazeNav_Gaze-Based_Pedestrian_Navigation/links/55c0b2c608ae9289a09b9baf/GazeNav-Gaze-Based-Pedestrian-Navigation.pdf>., Aug. 2015, 10 pages.

Golledge, Reginald G., "Wayfinding Behavior: Cognitive Mapping and Other Spatial Processes", Johns Hopkins University Press [retrieved Mar. 16, 2021], Retrieved from the Internet <https://play.google.com/store/books/details?pcampaignid=books_read_action&id=FREcQZYij4QC>., Jan. 14, 1999, 510 pages.

Gu, Yang et al., "WiFi based trajectory alignment, calibration and crowdsourced site survey using smart phones and foot-mounted IMUs", 2017 International Conference on Indoor Positioning and Indoor Navigation (IPIN), Sapporo [retrieved Feb. 12, 2021]. Retrieved from the Internet <http://www.ipin2017.org/ipinpapers/44/44.pdf>., Sep. 2017, 6 pages.

Gubbi, Jayavardhana et al., "Internet of Things (IoT): A Vision, Architectural Elements, and Future Directions", Future Generation Computer Systems, vol. 29, No. 7 [retrieved Feb. 23, 2021]. Retrieved from the Internet <https://arxiv.org/ftp/arxiv/papers/1207/1207.0203.pdf>., Sep. 2013, 19 pages.

Gutwin, Carl et al., "Peripheral Popout: The Influence of Visual Angle and Stimulus Intensity on Popout Effects", CHI '17: Proceedings of the 2017 CHI Conference on Human Factors in Computing Systems [retrieved Feb. 23, 2021]. Retrieved from the Internet <http://library.usc.edu.ph/ACM/CHI%202017/1proc/p208.pdf>., May 2017, 12 pages.

Hart, Sandra G. et al., "Development of NASA-TLX (Task Load Index): Results of Empirical and Theoretical Research", Advances in Psychology, vol. 52 [retrieved Feb. 23, 2021], Retrieved from the Internet <http://usd-apps.usd.edu/coglab/schieber/psyc792/workload/Hart-Staveland-1988.pdf>., 1988, 46 pages.

Huang, Haosheng et al., "A Survey of Mobile Indoor Navigation Systems", In Cartography in Central and Eastern Europe, Georg Gartner and Felix Ortag (Eds.). Springer Berlin Heidelberg, Berlin, Heidelberg [retrieved Feb. 23, 2021]. Retrieved from the Internet, <https://www.researchgate.net/profile/Georg-Gartner/publication/226163713_A_Survey_of_Mobile_Indoor_Navigation_Systems/links/5743007308aea45ee84a7628/A-Survey-of-Mobile-Indoor-Navigation-Systems.pdf>., Oct. 2009, 15 pages.

Huang, Haosheng et al., "Smart Environment for Ubiquitous Indoor Navigation", 2009 International Conference on New Trends in Information and Service Science [retrieved Feb. 23, 2021]. Retrieved from the Internet <http://www.geo.uzh.ch/~hhuang/pdfs/niss2009.pdf>., Jul. 2009, 5 pages.

Huey, Low Chee et al., "Augmented Reality Based Indoor Positioning Navigation Tool", 2011 IEEE Conference on Open Systems (ICOS2011) [retrieved Feb. 23, 2021). Retrieved from the Internet, <https://www.researchgate.net/profile/Patrick-Sebastian-2/publication/229034096_Augmented_reality_based_indoor_positioning_navigation_tool/links/59db2994aca272e6096e19f5/Augmented-reality-based-indoor-positioning-navigation-tool.pdf>., Sep. 2011, 5 pages.

Ibrahim, Azhar Mohd et al., "Intelligent Evacuation Management Systems: A Review", ACM Transactions on Intelligent Systems and Technology, vol. 7, No. 3, Article No. 36 [retrieved Feb. 23, 2021]. Retrieved from the Internet, <https://www.researchgate.net/profile/Azhar-Mohd-Ibrahim/publication/292671808_Intelligent_Evacuation_Management_Systems/links/5c6f45f7458515831f6514b2/Intelligent-Evacuation-Management-Systems.pdf>., Feb. 2016, 27 pages.

Ishikawa, Toru et al., "Spatial knowledge acquisition from direct experience in the environment: Individual differences in the development of metric knowledge and the integration of separately learned places", Cognitive Psychology, vol. 52, No. 2 [retrieved Feb. 23, 2021]. Retrieved from the Internet <http://helios.geog.ucsb.edu/~montello/pubs/Microgen_ID.pdf>., Dec. 22, 2005, 37 pages.

Karimi, Hassan A. et al., "Wayfinding and Navigation for People with Disabilities Using Social Navigation Networks", EAI Endorsed Transactions on Collaborative Computing, vol. 1, Iss. 2 [retrieved Feb. 11, 2021]. Retrieved from the Internet <https://media.proquest.com/media/hms/PFT/1/Rb6rB?_s=VtRdoupE%2BOPQ%2BXLhIC8F26FcecU%3D>., Oct. 2014, 14 pages.

Kataoka, Haruno et al., "Dynamic guide signs system to control pedestrian flow", UbiComp '16: Proceedings of the 2016 ACM International Joint Conference on Pervasive and Ubiquitous Computing: Adjunct [retrieved Feb. 23, 2021]. Retrieved from the Internet <https://www.ubittention.org/2016/data/paper8.pdf>., Sep. 2016, 6 pages.

Kolodziej, Krzysztof W. et al., "Local Positioning Systems: LBS Applications and Services", CRC Press, Taylor & Francis Group, LLC, Boca Raton, FL [retrieved Mar. 16, 2021], Retrieved from the Internet <https://play.google.com/store/books/details?pcampaignid=books_read_action&id=aV3LBQAAQBAJ>., 2006, 489 pages.

Kray, Christian et al., "Adaptive navigation support with public displays", IUI '05: Proceedings of the 10th international conference on Intelligent user interfaces [retrieved Feb. 17, 2021]. Retrieved from the Internet <http://christian-kray.de/pub/p3843-kray.pdf>., Jan. 2005, 3 pages.

Kray, Christian et al., "Sharing Control of Dispersed Situated Displays between Nomadic and Residential Users", MobileHCI '06: Proceedings of the 8th conference on Human-computer interaction with mobile devices and services [retrieved Feb. 17, 2021]. Retrieved from the Internet <https://core.ac.uk/download/pdf/1549697.pdf>., Sep. 2006, 8 pages.

Kray, Christian et al., "Towards a location model for indoor navigation support through public displays and mobile devices", Mobile Interaction with the Real World 2008, Amsterdam, The Netherlands [retrieved Feb. 17, 2021]. Retrieved from the Internet <http://citeseerx.ist.psu.edu/viewdoc/download?doi=10.1.1.143.7742&rep=rep1&type=pdf>., Sep. 2008, 5 pages.

Lau, Seng-Yong et al., "A measurement study of zigbee-based indoor localization systems under RF interference", WINTECH '09: Proceedings of the 4th ACM international workshop on Experimental evaluation and characterization [retrieved Feb. 23, 2021].

(56) References Cited

OTHER PUBLICATIONS

Retrieved from the Internet <https://citeseerx.ist.psu.edu/viewdoc/download?doi=10.1.1.575.4325&rep=rep1&type=pdf>., Sep. 2009, 8 pages.

Lee, Jiyeong et al., "OGC® IndoorGML—with Corrigendum", Open Geospatial Consortium, 14-005r4, Version 1.0.3 [retrieved Feb. 17, 2021]. Retrieved from the Internet <https://docs.opengeospatial.org/is/14-005r5/14-005r5.html>., Mar. 9, 2018, 92 pages.

Lewis, James R. et al., "Revisiting the Factor Structure of the System Usability Scale", Journal of Usability Studies, vol. 12, No. 4 [retrieved Feb. 25, 2021]. Retrieved from the Internet <http://uxpajournal.org/wp-content/uploads/pdf/JUS_Lewis_August2017.pdf>., Aug. 2017, 10 pages.

Lewis, James R. et al., "The Factor Structure of the System Usability Scale", In: Kurosu M. (eds) Human Centered Design. HCD 2009. Lecture Notes in Computer Science, vol. 5619. Springer, Berlin, Heidelberg [retrieved Feb. 23, 2021]. Retrieved from the Internet <https://link.springer.com/content/pdf/10.1007/978-3-642-02806-9_12.pdf>., 2009, 10 pages.

Li, Huoran et al., "Characterizing Smartphone Usage Patterns from Millions of Android Users", IMC '15: Proceedings of the 2015 Internet Measurement Conference [retrieved Feb. 25, 2021]. Retrieved from the Internet <http://citeseerx.ist.psu.edu/viewdoc/download?doi=10.1.1.714.9313&rep=rep1&type=pdf>., Oct. 2015, 14 pages.

Liu, Alan L. et al., "Indoor wayfinding: Developing a functional interface for individuals with cognitive impairments", Disability and Rehabilitation: Assistive Technology, vol. 3, No. 1-2 [retrieved Feb. 25, 2021]. Retrieved from the Internet <https://www.cs.rochester.edu/u/kautz/papers/dandr-liu.pdf>., Mar. 23, 2007, 24 pages.

Matviienko, Andrii et al., "Deriving Design Guidelines for Ambient Light Systems", MUM '15: Proceedings of the 14th International Conference on Mobile and Ubiquitous Multimedia [retrieved Feb. 25, 2021]. Retrieved from the Internet <http://juttafortmann.de/pubs/2015-11-30%20Design%20Guidelines%20for%20Ambient%20Light%20Systems-MUM15.pdf>., Nov. 2015, 14 pages.

Mauriello, Matthew L. et al., "Thermporal: An Easy-To-Deploy Temporal Thermographic Sensor System to Support Residential Energy Audits", CHI '19: Proceedings of the 2019 CHI Conference on Human Factors in Computing Systems [retrieved Feb. 25, 2021]. Retrieved from Internet, <http://web.stanford.edu/~mattm401/docs/2019-Mauriello-CHI-ThermporalAnEasyToDeployTemporalThermographicSensorSystemToSupportResidentialEnergyAudits-Paper.pdf>, May 2019, 14 pages.

Moller, Andreas et al., "Experimental evaluation of user interfaces for visual indoor navigation", CHI '14: Proceedings of the SIGCHI Conference on Human Factors in Computing Systems [retrieved Feb. 25, 2021]. Retrieved from the Internet <https://dl.acm.org/doi/abs/10.1145/2556288.2557003>., Apr. 2014, 10 pages.

Müller, Jörg et al., "Exploring factors that influence the combined use of mobile devices and public displays for pedestrian navigation", NordiCHI '08: Proceedings of the 5th Nordic conference on Human-computer interaction: building bridges [retrieved Feb. 25, 2021]. Retrieved from the Internet <https://citeseerx.ist.psu.edu/viewdoc/download?doi=10.1.1.540.461&rep=rep1&type=pdf>., Oct. 2008, 10 pages.

Mulloni, Alessandro et al., "Handheld Augmented Reality Indoor Navigation with Activity-Based instructions", MobileHCI '11: Proceedings of the 13th International Conference on Human Computer Interaction with Mobile Devices and Services [retrieved Feb. 25, 2021]., Retrieved from the Internet <https://citeseerx.ist.psu.edu/viewdoc/download?doi=10.1.1.443.487&rep=rep1&type=pdf>., Aug. 30, 2011, 10 pages.

Olivier, Patrick et al., "Crossmodal Ambient Displays", People and Computers XX—Engage. Springer, London [retrieved Mar. 1, 2021]. Retrieved from the Internet, <https://www.researchgate.net/profile/Stephen-Gilroy/publication/226411202_Crossmodal_Ambient_Displays/links/0fcfd5112b2c77729e000000/Crossmodal-Ambient-Displays.pdf>., Sep. 2006, 18 pages.

O'Neill, Michael J., "Effects of Signage and Floor Plan Configuration on Wayfinding Accuracy", Environment and Behavior, vol. 23, No. 5 [retrieved Mar. 16, 2021]. Retrieved from the Internet <https://journals.sagepub.com/doi/10.1177/0013916591235002>., Sep. 1, 1991, 22 pages.

Ramirez, Leonardo et al., "Towards Human-Centered Support for Indoor Navigation", CHI '09 Proceedings of the SIGCHI Conference on Human Factors in Computing Systems [retrieved Mar. 1, 2021]. Retrieved from the Internet <http://citeseerx.ist.psu.edu/viewdoc/download?doi=10.1.1.505.6665&rep=rep1&type=pdf>., Apr. 2009, 4 pages.

Randell, Cliff et al., "Personal Position Measurement Using Dead Reckoning", ISWC '03: Proceedings of the 7th IEEE International Symposium on Wearable Computers [retrieved Mar. 1, 2021]. Retrieved from the Internet <https://www.computer.org/csdl/proceedings-article/iswc/2003/20340166/12OmNx6xHnG>., Oct. 2003, 11 pages.

Ray, Partha P., "Home Health Hub Internet of Things (H3IoT): An architectural framework for monitoring health of elderly people", 2014 International Conference on Science Engineering and Management Research (ICSEMR) [retrieved Mar. 2, 2021], Retrieved from the Internet <https://www.academia.edu/download/37322191/home_health_hub.pdf>., Nov. 2014, 3 pages.

Rogers, Yvonne et al., "Ambient influence: can twinkly lights lure and abstract representations trigger behavioral change?", UbiComp '10: Proceedings of the 12th ACM international conference on Ubiquitous computing [retrieved Mar. 2, 2021]. Retrieved from the Internet <http://yvonnerogers.com/wp-content/uploads/2014/07/rogersUbicomp10.pdf>., Sep. 2010, 10 pages.

Rukzio, Enrico et al., "Design, implementation and evaluation of a novel public display for pedestrian navigation: the rotating compass", CHI '09: Proceedings of the SIGCHI Conference on Human Factors in Computing Systems [retrieved Mar. 2, 2021]. Retrieved from the Internet <https://www.uni-ulm.de/fileadmin/website_uni_ulm/iui.inst.100/institut/Papers/Prof_Rukzio/2009/RukzioCHI2009.pdf>., Apr. 2009, 10 pages.

Sauro, Jeff, "Measuring Usability with the System Usability Scale (SUS)", Measuring U Blog [retrieved Mar. 2, 2021]. Retrieved from the Internet <https://measuringu.com/sus/>., Feb. 2, 2011, 11 pages.

Seidel, Scott Y. et al., "Site-Specific Propagation Prediction for Wireless In-Building Personal Communication System Design", IEEE Transactions on Vehicular Technology, vol. 43, No. 4 [retrieved Mar. 2, 2021]. Retrieved from the Internet <https://ieeexplore.ieee.org/abstract/document/330150>., Nov. 1994, 13 pages.

Serra, Alberto et al., "Indoor Pedestrian Navigation System Using a Modern Smartphone", MobileHCI '10: Proceedings of the 12th international conference on Human computer interaction with mobile devices and services [retrieved Mar. 2, 2021]. Retrieved from the Internet, <https://www.researchgate.net/profile/Alberto-Serra-3/publication/221270436_Indoor_pedestrian_navigation_system_using_a_modern_smartphone/links/0046351ac50f1574bf000000/Indoor-pedestrian-navigation-system-using-a-modern-smartphone.pdf>., Sep. 2010, 2 pages.

Sezer, Omer B. et al., "Context-Aware Computing, Learning, and Big Data in Internet of Things: A Survey", IEEE Internet of Things Journal, vol. 5, No. 1 [retrieved Mar. 2, 2021]. Retrieved from the Internet <https://doi.org/10.1109/JIOT.2017.2773600>., Feb. 2018, 30 pages.

Taher, Faisal et al., "Exploring User Preferences for Indoor Navigation Support through a Combination of Mobile and Fixed Displays", MobileHCI '11: Proceedings of the 13th International Conference on Human Computer Interaction with Mobile Devices and Services [retrieved Mar. 2, 2021]. Retrieved from the Internet <https://www.faisaltaher.com/papers/ExploringUserPreferences.pdf>., Aug. 2011, 10 pages.

Taher, Faisal et al., "Formative Studies for Dynamic Wayfinding Support with In-Building Situated Displays and Mobile Devices", MUM '09: Proceedings of the 8th International Conference on Mobile and Ubiquitous Multimedia [retrieved Mar. 2, 2021]. Retrieved from the Internet <https://core.ac.uk/download/pdf/67566.pdf>., Nov. 2009, 10 pages.

Tallon, Loic, "The Future of Mapping and Wayfinding at The Met", The Met Fifth Avenue Blog [retrieved Feb. 12, 2021]. Retrieved

(56) References Cited

OTHER PUBLICATIONS from the Internet <https://www.metmuseum.org/blogs/digital-underground/2016/future-of-mapping-and-wayfinding>., Apr. 18, 2016, 11 pages.

Thiagarajan, Arvind et al., "Accurate, low-energy trajectory mapping for mobile devices", NSDI'11: Proceedings of the 8th USENIX conference on Networked systems design and implementation [retrieved Feb. 15, 2021]. Retrieved from the Internet <https://www.usenix.org/legacy/events/nsdi11/tech/full_papers/Thiagarajan.pdf?CFI>., Mar. 2011, 14 pages.

Wang, Xiangyu et al., "DeepMap: Deep Gaussian Process for Indoor Radio Map Construction and Location Estimation", 2018 IEEE Global Communications Conference (GLOBECOM), Abu Dhabi, United Arab Emirates [retrieved Feb. 15, 2021]. Retrieved from the Internet <Z:\Shared\Client-Files\Adobe\Files\P10024-US\TempArt>., Dec. 2018, 7 pages.

Yusuf, Bulent, "How to create interactive digital floor plans with NavVis IndoorViewer", NavVis Blog [retrieved Feb. 15, 2021]. Retrieved from the Internet <https://www.navvis.com/blog/how-to-create-interactive-digital-floorplans-with-navvis-indoorviewer>., Jul. 23, 2019, 13 pages.

Zanella, Andrea et al., "Internet of Things for Smart Cities", IEEE Internet of Things Journal, vol. 1, No. 1 [retrieved Mar. 2, 2021.]. Retrieved from the Internet <https://ieeexplore.ieee.org/stamp/stamp.jsp?arnumber=6740844>., Feb. 2014, 11 pages.

Zhang, Jing et al., "Navigation Systems for Individuals with Visual Impairment: A Survey", iCREATe '08: Proceedings of the 2nd International Convention on Rehabilitation Engineering & Assistive Technology [retrieved Mar. 4, 2021]. Retrieved from the Internet <https://dl.acm.org/doi/10.5555/1983222.1983264>., May 2008, 4 pages.

Zimring, Craig et al., "The costs of confusion: Non-monetary and monetary costs of the Emory University Hospital wayfinding system", Atlanta: Georgia Institute of Technology vol. 91, No. 2, 1990.

2114020.7 , "Foreign Office Action", GB Application No. 2114020.7, dated Jun. 8, 2022, 15 pages.

\* cited by examiner

600

SYSTEMS FOR GENERATING INDICATIONS OF TRAVERSABLE PATHS

BACKGROUND

Navigational systems for wayfinding in physical environments augment user experiences within the physical environments. This augmentation typically includes navigational indications which are intended to guide users that are unfamiliar with a physical environment to a destination within the physical environment. For example, a system for wayfinding in an airport includes a first display device that displays an indication of a particular terminal associated with a user's flight plan and a second display device that displays an indication of a direction to travel in order to arrive at the particular terminal.

Digital systems for wayfinding are designed for a specific physical environment and include display devices such as digital kiosks which are disposed in pre-assigned locations within the specific physical environment. These digital kiosks typically provide functionality in addition to providing navigational information. For example, a user interacts in a user interface of a display device of a digital wayfinding system in a museum to view a path to a next exhibit in the museum, learn historical information about a current exhibit, inquire about popular exhibits, and so forth.

Conventional digital wayfinding systems are designed for relatively long-term deployment with display devices disposed in locations of a physical environment that are unlikely to change for a relatively long period of time. This is because conventional systems are not scalable or capable of efficiently changing in response to location changes of display devices to locations which are not pre-assigned locations in designs of these systems. In the previous example, if the museum adds a new exhibit such that a new display device is required in a location that is not included in the pre-assigned locations, then the new display device cannot be added without a substantial redesign to the museum's digital wayfinding system.

SUMMARY

Techniques and systems are described for generating indications of traversable paths. In an example, a computing device implements a navigation system to receive map data describing a map of a physical environment that includes a destination, locations of display devices, and relative orientations of the display devices in the physical environment. The navigation system forms a navigation graph by representing the destination and the locations of the display devices as nodes of the navigation graph and connecting the nodes with edges that indicate traversable path segments in the physical environment. For example, the traversable path segments represent travelable portions of the physical environment such as segments of physical hallways, physical rooms connected by doors, portions of the physical environment which are not currently closed due construction, and so forth.

The navigation system receives request data via a network describing a request for navigation to the destination. In one example, the request data also describes a source of the request. For example, if the source of the request is disposed inside of the physical environment, then the request data is transmitted by a display device of the display devices. In another example, the source of the request is disposed outside of the physical environment. In this example, the request data is transmitted by a remote computing device.

The navigation system generates indications of a traversable path to the destination for display by the display devices based on the navigation graph and the relative orientations of the display devices. For example, the traversable path begins a location of a particular display device of the display devices based on the request for navigation described by the request data. In a first example, the traversable path is a shortest path from the location of the particular display device to the destination in the physical environment. In a second example, the traversable path is not the shortest path from the location of the particular display device to the destination in the physical environment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
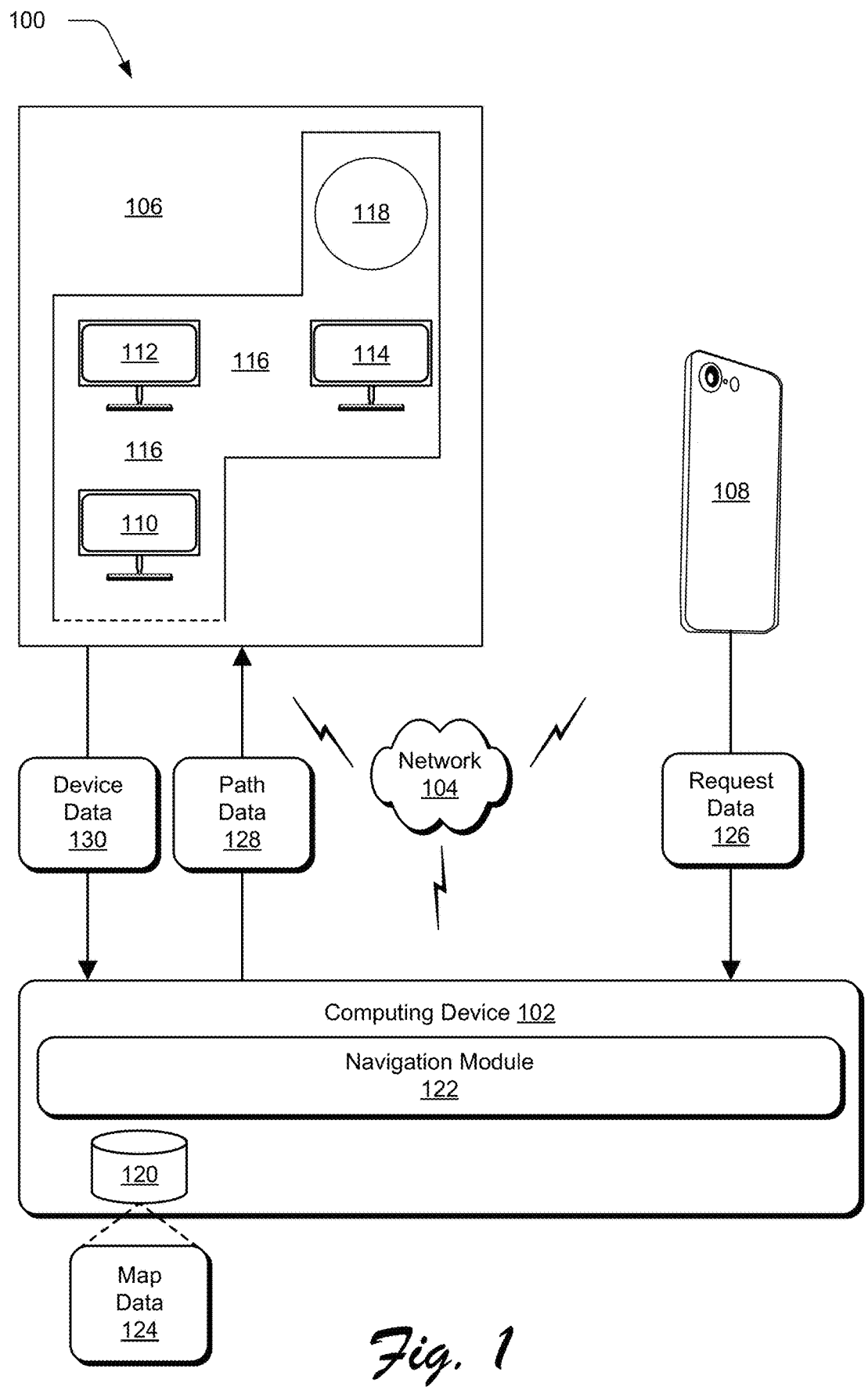
FIG. 1 is an illustration of an environment in an example implementation that is operable to employ digital systems and techniques for generating indications of traversable paths as described herein.

Conventional digital wayfinding systems are not scalable or capable of efficiently changing in response to location changes of display devices to locations which are not pre-assigned locations in designs of these systems. For example, a conventional system is designed for a particular physical environment and this design includes display devices disposed in pre-assigned locations within the physical environment. In this example, a relocation of a display device to physical location which is not a pre-assigned location is not possible without redesigning the conventional digital wayfinding system.

To overcome the limitations of conventional digital wayfinding systems, techniques and systems are described for generating indications of traversable paths. In one example, a computing device implements a navigation system to receive map data describing a map of a physical environment that includes a destination, locations of display devices, and relative orientations of the display devices in the physical environment. For example, the map of the physical environment is an approximation of the physical environment such as a digital image of the physical environment or a digital image of a physical map of the physical environment.

The navigation system forms a navigation graph based on the map data. In an example, the map data describes the map of the physical environment which is a representation of the physical environment and the navigation graph is a representation of the map of the physical environment. To form the navigation graph in one example, the navigation system represents the destination and the locations of the display devices as nodes of the navigation graph and connects the nodes with edges that indicate traversable path segments in the physical environment. For example, the navigation system determines the traversable path segments based on the relative orientations of the display devices in the physical environment. In one example, the edges of the navigation graph include weights which correspond to distances of the traversable path segments in the physical environment.

The navigation system establishes a mesh network between the display devices in one example. For example, each of the display devices includes a microcontroller and a Wi-Fi enabled microchip such that each display device is capable of wireless communication with every other display device via the mesh network. In one example, the mesh network is a closed network and is independent from any wireless communication infrastructure of the physical environment. In another example, the mesh network is an open network and is usable to communicate data via a wireless network of the physical environment.

For example, the navigation system also establishes a connection between the computing device and an external network such a cloud-based network. In this example, the navigation system transmits data to remote computing devices via the external network and the navigation system receives data transmitted by the remote computing devices via the external network. The navigation system receives request data via a network describing a request for navigation to the destination. In one example, the request data also describes a source of the request such as a source of the request data. In this example, the source of the request includes a physical location, a device type, a device identification, and so forth.

In an example in which the source of the request is disposed inside of the physical environment, the request data is transmitted by a display device of the display devices. For example, a user interacts with an input device of the display device (e.g., a touchscreen, a microphone, a stylus, a keyboard, a mouse, and so forth) to generate the request data. In this example, the navigation system receives the request data via the mesh network.

In one example in which the source of the request is disposed outside of the physical environment, the request data is transmitted by a remote computing device. For example, a user interacts with an input device of the remote computing device (e.g., a touchscreen, a microphone, a stylus, a keyboard, a mouse, etc.) to generate the request data. In another example, the navigation system receives the request data via the external network.

The navigation system determines a traversable path to the destination based on the navigation graph. In one example, this includes determining a beginning of the traversable path based on the source of the request. For example, if the source of the request is a particular display device of the display devices, then the traversable path begins at the particular display device and ends at the destination. If the source of the request is the remote computing device, then the traversable path begins at a specific display device of the display devices and ends at the destination. In one example, the specific display device is adjacent to or visible at an entrance to the physical environment.

For example, the navigation system determines the traversable path to the destination based on the weights of the edges of the navigation graph. In a first example, the navigation system determines the traversable path as a shortest path to the destination in the physical environment. In a second example, the navigation system does not determine the traversable path as the shortest path to the destination. In this example, the navigation system determines the traversable path based on other considerations such as minimizing physical interactions between users in the physical environment.

The navigation system generates indications of the traversable path to the destination for display by the display devices. For example, the indications of the traversable path are directional indications describing the traversable path. In some examples, the indications of the traversable path are visual indications, audio indications, tactile indications, and so forth. In other examples, the indications are textual indications, colored indications, animated indications, etc. In one example, a display device that is adjacent to the destination displays an indication of an arrival at the destination. In this example, a display device that is not adjacent to the destination is capable of displaying an indication of a deviation from the traversable path.

The described systems improve digital wayfinding technology relative to conventional digital wayfinding systems which are not scalable and are limited to locating display devices in pre-assigned locations within a physical environment. Since the described systems form the navigation graph based on the map of the physical environment that includes the locations and orientations of the display devices, physical locations of the display devices are changeable simply by changing the corresponding locations included in the map of the physical environment and forming an updated navigation graph based on the changed locations. In this manner, a number of display devices included in the physical environment is increasable or decreasable to support a variety of different scenarios within the physical environment.

Consider an example in which the physical environment is a medical facility during a global pandemic caused by a highly contagious virus. In this example, the medical facility offers testing services for the virus at the facility and the navigation system generates indications of traversable paths to a destination, for example, a test administration site in the medical facility. For example, the navigation system receives map data describing a map of the medical facility including the destination, locations of display devices, and relative orientations of the display devices in the medical facility. The navigation system forms a navigation graph based on the map data by representing the destination and the locations of the display devices as nodes of the navigation graph and connecting the nodes with edges that indicate traversable path segments in the medical facility.

Continuing this example, the navigation system receives request data describing a request for navigation to the destination and the navigation system uses the navigation graph to determine a traversable path to the destination. The navigation system generates indications of the traversable path for display by the display devices. A vaccine becomes available for the virus and the medical facility offers vaccination services, for example, at a different destination in the medical facility. Some of the display devices are relocated in the facility and additional display devices are added to the display devices of the medical facility to accommodate the vaccination services.

The navigation system receives updated map data describing an updated map of the medical facility including the different destination, updated locations of the display devices, and updated relative orientations of the display devices in the medical facility. The navigation system forms an updated navigation graph based on the updated map data. Upon receiving request data describing a request for navigation to the different destination, the navigation system determines a traversable path to the different destination based on the updated navigation graph. The navigation system generates indications of this traversable path for display by the display devices in the medical facility which is not possible in conventional digital wayfinding systems that are limited to locating display devices in pre-assigned locations within a physical environment.

Consider another example in which the physical environment is the medical facility during the global pandemic and the medical facility offers testing for the virus at the destination within the medical facility. In this example, the edges of the navigation graph are weighted with weights corresponding to distances of the traversable path segments in the medical facility represented by the edges. The navigation system is capable of using the weights of the edges and corresponding segments of a traversable path to determine a length of the traversable path. Continuing this example, the navigation system receives request data describing a request for navigation to the destination from a first remote computing device. For example, the destination is the test administration site and a first user of the first remote computing device has symptoms of the virus and needs to be tested for the virus at the test administration site.

The navigation system determines that a traversable path to the destination begins at a location of a particular display device. The location of the particular display is near or adjacent to an entrance to the medical facility in one example. The navigation system also determines that the traversable path to the destination ends at a location of a specific display device that is adjacent to the destination in the medical facility. For example, the navigation system uses the navigation graph with the weighted edges to the determine the traversable path as a shortest path from the location of the particular display device to the location of the specific display device. In one example, the navigation system determines the shortest path using Dijkstra's algorithm.

The navigation system generates indications of the traversable path for display by the display devices and the user of the first remote computing device enters the facility and identifies an indication of the traversable path displayed by the particular display device. As the first user of the first remote computing device approaches the particular display device, a motion sensor of the particular display device (e.g., a passive infrared sensor configured to detect motion) detects the user's movement in the medical facility. For example, each of the display devices in the medical facility includes a motion sensor. The particular display device transmits sensor data describing the detected movement to the navigation system via the mesh network.

As the first user follows the indications of the traversable path displayed by display devices along the traversable path, the navigation system receives sensor data describing detected motion corresponding to the user's movements along the traversable path in the medical facility. For example, the navigation system leverages an order in which the display devices communicate the sensor data describing detected motion in the medical facility to monitor a progress of the first user along the traversable path. Continuing this example, the navigation system receives request data describing a request for navigation to the destination from a second remote computing device. A second user of the second remote computing device also has symptoms of the virus and needs to be tested for the virus at the test administration site within the medical facility.

In this example, the navigation system determines that the first user of the first remote computing device has not yet reached the destination in the medical facility. For example, the navigation system has not received sensor data describing detected motion from the specific display device that is adjacent to the destination in the medical facility. The navigation system determines that navigating the second user of the second remote computing device to the destination would be likely to cause unnecessary physical interaction between the users of the first and second remote computing devices.

Continuing this example, the navigation system generates an indication of a delay in navigation to the destination for display by the particular display device that is adjacent to the entrance of the medical facility. For example, the indication of the delay in navigation is a textual indication explaining a reason for the delay in navigation to the destination. The second user of the second remote computing device identifies the indication of the delay in navigation to the destination as the second user enters the medical facility. In one example, the navigation system determines the first user's progress along the traversable path to the destination in the medical facility based on the order in which the display devices communicate the sensor data via the mesh network.

The navigation system then uses the first user's determined progress and the weights of the edges corresponding to traversable path segments between the first user and the destination to approximate an amount of time it will take for the first user to reach the destination. For example, the navigation system generates an indication of the amount of time it will take for the first user to reach the destination for display by the particular display device. The particular display device displays the indication and the second user identifies the amount of time it will take for the first user to reach the destination.

In one example, the second user travels further into the medical facility despite the indication of the delay in navigation displayed by the particular display device. For example, a motion sensor of a display device in the medical facility detects the second user's movement as the second user travels further into the medical facility. The display device communicates sensor data describing the detected movement to the navigation system via the mesh network. The navigation system receives the sensor data and processes the sensor data to generate an indication of a warning for display by the display device. In an example, the indication of the warning indicates that the medical facility will not test the second user for the virus at the test administration site if the second user continues to travel further into the medical facility.

In another example, the second user waits near the particular display device until the first user reaches the destination. The navigation system receives sensor data from the specific display device that is adjacent to the destination describing detected motion in the medical facility. For example, the navigation system determines that the first user has reached the destination. The navigation system generates indications of the traversable path from the location of the particular display device to the location of the specific display device. In one example, this traversable path is the shortest path to the destination from the location of the particular display device. The display devices display the indications of the traversable path to guide the second user to the destination.

In one example, instead of generating the indications of the traversable path for the second user upon determining that the first user arrived at the destination, the navigation system leverages sensor data of the specific display device that is located adjacent to the destination to determine that the first user has departed from the destination. In this example, the navigation system generates the indications of the traversable path to the destination for the second user upon determining that the first user has departed from the destination. For example, the navigation system generates indications of a traversable path to an exit of the medical facility. In this example, the navigation system determines the traversable path to the exit of the medical facility such that the first user following the traversable path to the exit does not interact with the second user in the medical facility.

Consider an example in which the navigation system receives request data describing the request for navigation to the destination from the second remote computing device. In this example, the navigation system also determines that the first user of the first remote computing device has not yet reached the destination. For example, the navigation system uses the navigation graph with the weighted edges to determine a different traversable path to the destination that is not the shortest path from the location of the particular display device to the location of the specific display device. In one example, the navigation system determines the different traversable path such that the first and second users of the remote computing devices do not interact within the medical facility.

In an example, the navigation system determines the different traversable path as having a greater distance than the traversable path. The navigation system generates indications of the different traversable path for display by the display devices. The second user of the second remote computing device follows the indications displayed by the display devices and the first user arrives at the destination and departs from the destination before the second user arrives at the destination.

In one example, the navigation system monitors progress of the first user along the traversable path to the destination and monitors progress of the second user along the different traversable path to the destination using sensor data received from the display devices via the mesh network. If the navigation system determines a likelihood of the second user reaching the destination before the first user departs from the destination, then the navigation system modifies the different traversable path in substantially real time to add traversable path segments of the medical facility to the different traversable path which prevents interaction between the first and second users of the remote computing devices in one example. In other examples, the display devices are relocated in the medical facility to define multiple physical traversable paths to the destination which is not possible using conventional digital wayfinding systems that are limited to locating display devices in pre-assigned locations within a physical environment. In this manner, the described systems improve digital wayfinding technology relative to conventional digital wayfinding systems which are not scalable.

Term Examples

As used herein, the term "map of a physical environment" refers to a representation of a physical environment that depicts physical features of the physical environment and relationships between the physical features. By way of example, the relationships include spatial relationships between the physical features of the physical environment.

As used herein, the term "navigation graph" refers to a representation of a map of a physical environment. By way of example, a navigation graph includes nodes that are connected by edges.

As used herein, the term "node" of a navigation graph refers to a representation of a destination in a physical environment or a location of a display device in the physical environment.

As used herein, the term "edge" of a navigation graph refers to a representation of a traversable path segment in a physical environment. By way of example, an edge between two nodes of the navigation graph represents a traversable path segment between locations in the physical environment represented by each of the two nodes.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a physical environment 106 such as an indoor environment and a remote computing device 108 such as a mobile device. The physical environment 106 and the remote computing device 108 are each connected to the network 104 in one example. As shown, the physical environment 106 includes display devices 110-114 which are disposed along a traversable path 116 to a destination 118 in the physical environment 106. For example, each of the display devices 110-114 is connected to the network 104 and the display devices 110-114 are communicatively coupled to the computing device 102 via the network 104.

The display devices 110-114 are capable of ranging from full resource devices with substantial memory and processor resources to low-resource devices with limited memory and/or processing resources. In one example, the display devices 110-114 include arrays of light emitting diodes. In another example, some or all of the display devices 110-114 are digital kiosks that are capable of receiving user inputs such as audio inputs.

For example, one or all of the display devices 110-114 includes a user interface configured to receive a user input. In an example, a user interacts with an input device of one the display devices 110-114 (e.g., a touchscreen, a microphone, a stylus, a keyboard, a mouse, and so forth) to generate the user input. In this example, the display devices 110-114 are capable of transmitting data describing received user inputs to the computing device 102.

For example, each of the display devices 110-114 includes a microcontroller and a Wi-Fi enabled microchip such that each display device 110-114 is capable of wireless communication with every other display device 110-114 via a mesh network. In one example, the mesh network is a closed network and is independent from the network 104. In another example, the mesh network is an open network and is also connected to the network 104.

The computing device 102 is illustrated to include a storage device 120 and a navigation module 122. In one example, the computing device 102 implements the navigation module 122 to receive and/or generate map data 124 which is stored on the storage device 120. The map data 124 describes the physical environment 106. For example, the map data 124 describes a map of the physical environment 106 and this map includes an indication of the destination 118 in the physical environment 106 as well as indications of locations of the display devices 110-114 in the physical environment 106.

The navigation module 122 is capable of generating and/or receiving the map data 124 in a variety of different ways. In an example, the navigation module 122 generates the map data 124 using an existing map of the physical environment 106 which approximates dimensions and scale of the physical environment 106. For example, if a digital image depicting the physical environment 106 such as a digital photograph of the physical environment 106 is available, then navigation module 122 generates the map data 124 using the digital image. If a map of the physical environment 106 is available such as a map commonly posted in a building, then the navigation module 122 generates the map data 124 using this map or a digital photograph of the map. In one example, the navigation module 122 receives the map data 124 which describes an annotated map of the physical environment 106.

Regardless of a manner in which the navigation module 122 determines locations of the display devices 110-114 and the destination 118 in the physical environment 106, the navigation module 122 generates the map data 124 as describing relative orientations of the display devices 110-114 in the physical environment 106. For example, the navigation module 122 indicates the orientations of the display devices 110-114 as line segments extending from each of the display devices 110-114. In this example, each line segment corresponds to a viable direction of travel in the physical environment 106. In one example, the navigation module 122 receives the map data 124 which describes the annotated map of the physical environment 106 including the indicated orientations of the display devices 110-114 as the line segments extending from each of the display devices 110-114.

Consider an example in which the navigation module 122 generates the map data 124 as describing two viable directions of travel relative to display device 110. One of these directions is down and the other direction is up towards display device 112. The display device 112 also has two viable directions of travel which are down towards the display device 110 and right towards display device 114. In this example, the display device 114 has viable directions of travel that are left towards the display device 112 and up towards the destination 118.

The navigation module 122 distinguishes between these directions of viable travel in the physical environment 106 by any suitable technique such as line segments with different colors, different styles, and so forth. In one example, the manner in which the directions of viable travel are distinguished is any type of identifier provided that the identifier is unique per direction of viable travel in the physical environment 106. The navigation module 122 then connects the directions of travel between the display devices 110-114 and the destination 118 forming a single connected graph between the display devices 110-114 and the destination 118 which is described in detail with respect to FIG. 2 and FIGS. 3A-3C.

As shown in FIG. 1, the remote computing device 108 transmits request data 126 to the computing device 102 via the network 104. The request data 126 describes a request for navigation to the destination 118 and the computing device 102 implements the navigation module 122 to receive the request data 126. The navigation module 122 processes the request data 126 and/or the map data 124 to generate path data 128 which describes the traversable path 116 to the destination 118 in the physical environment 106.

The navigation module 122 transmits the path data 128 to the physical environment 106 via the mesh network or the network 104. For example, the navigation module transmits the path data 128 to the display devices 110-114. The display devices 110-114 receive the path data 128 and process the path data 128 to display indications of the traversable path 116 to the destination 118. Consider an example in which a user of the remote computing device 108 interacts with a user interface of the remote computing device 108 to generate the request data 126. In one example, the user of the remote computing device 108 interacts with an input device of the remote computing device 108 (e.g., a touchscreen, a microphone, a stylus, a keyboard, a mouse, etc.) to generate the request data 126. In this example, the user of the remote computing device 108 is unfamiliar with the physical environment 106 but understands that the destination 118 is located within the physical environment 106 and desires navigation to the destination 118.

Continuing the example, the user of the remote computing device 108 enters the physical environment 106 and the display device 110 displays an indication of the traversable path 116. For example, the display device 110 displays a directional indication such as an arrow pointing up to indicate the traversable path 116. The user of the remote computing device 108 follows the directional indication displayed by the display device 110 and observes that the display device 112 is also displaying an indication of the traversable path 116. In one example, the display device 112 displays an arrow pointing right and the user of the remote computing device 108 proceeds towards the right in the physical environment 106.

The display device 114 displays an indication of the traversable path 116 which is an arrow pointing up towards the destination 118. The user of the remote computing device 108 follows this directional indication and arrives at the destination 118. For example, the destination 118 also includes a display device and this display device displays an indication that the user of the remote computing device 108 has arrived at the destination 118. In this example, the indication of arrival provides confirmation to the user of the remote computing device 108 that the user has arrived at the destination 118.

The computing device 102 is illustrated as receiving device data 130 via the mesh network or the network 104 which describes the physical environment 106, the display devices 110-114, and/or the destination 118. For example, the device data 130 describes the indication of arrival which confirms that the user of the remote computing device 108 has arrived at the destination 118. In one example, the device data 130 describes operational characteristics of the display devices 110-114. Examples of these operational characteristics include remaining battery power of the display devices 110-114, operational states of the display devices 110-114 such as whether the display devices are currently displaying indications of the traversable path 116, sensor data of the display devices 110-114, environmental data available to the display devices 110-114, and so forth.

For example, each of the display devices 110-114 includes a motion sensor such as a passive infrared sensor configured to detect motion and the device data 130 includes motion sensor data from each of the display devices 110-114. In some examples, the display devices 110-114 include multiple sensors such as sensors which measure tilt, shock, vibration, acceleration, orientation, heading, position, and so forth. In these examples, data from the multiple sensors is also included in the device data 130.

Consider an example in which the request data 126 is included in the device data 130. In this example, a user enters the physical environment 106 and interacts with a user interface of one of the display devices 110-114 to generate the request data 126 that describes the request for navigation to the destination 118. The request data 126 is transmitted to the computing device 102 as part of the device data 130 in one example. For example, the computing device 102 receives the request data 126 and processes the request data 126 and/or the map data 124 to generate the path data 128 as describing the traversable path 116.

In another example, the device data 130 describes updated request data 126. In this example, the user of the remote computing device 108 follows the traversable path 116 to the destination 118 and then interacts with a user interface of one of the display devices 110-114 to generate updated request data 126 that describes a request for navigation to an additional destination. For example, the additional destination is also included in the physical environment 106. In another example, the additional destination is not included in the physical environment 106.

Figure 2:
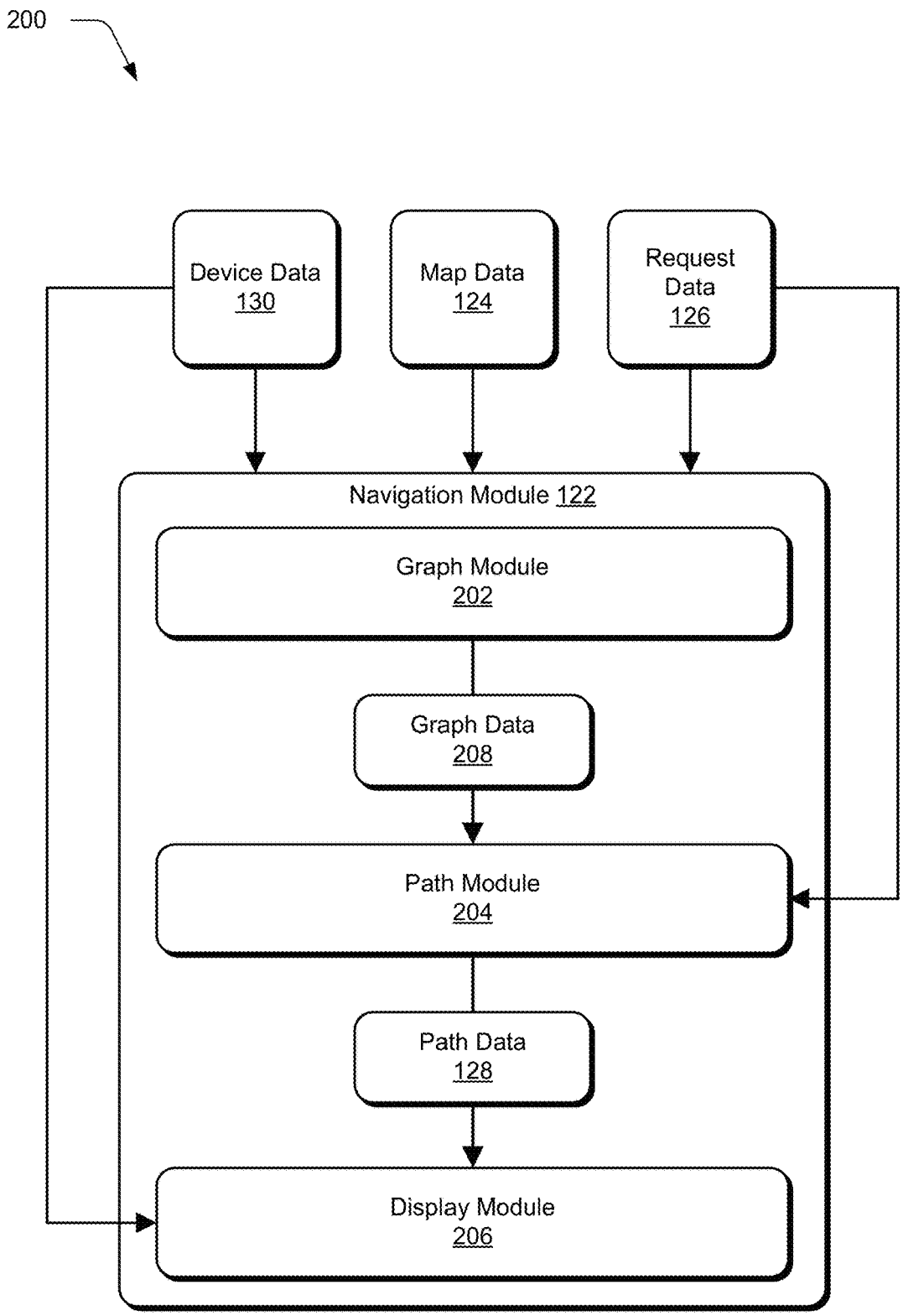
FIG. 2 depicts a system in an example implementation showing operation of a navigation module for generating indications of traversable paths.
Figure 3A:
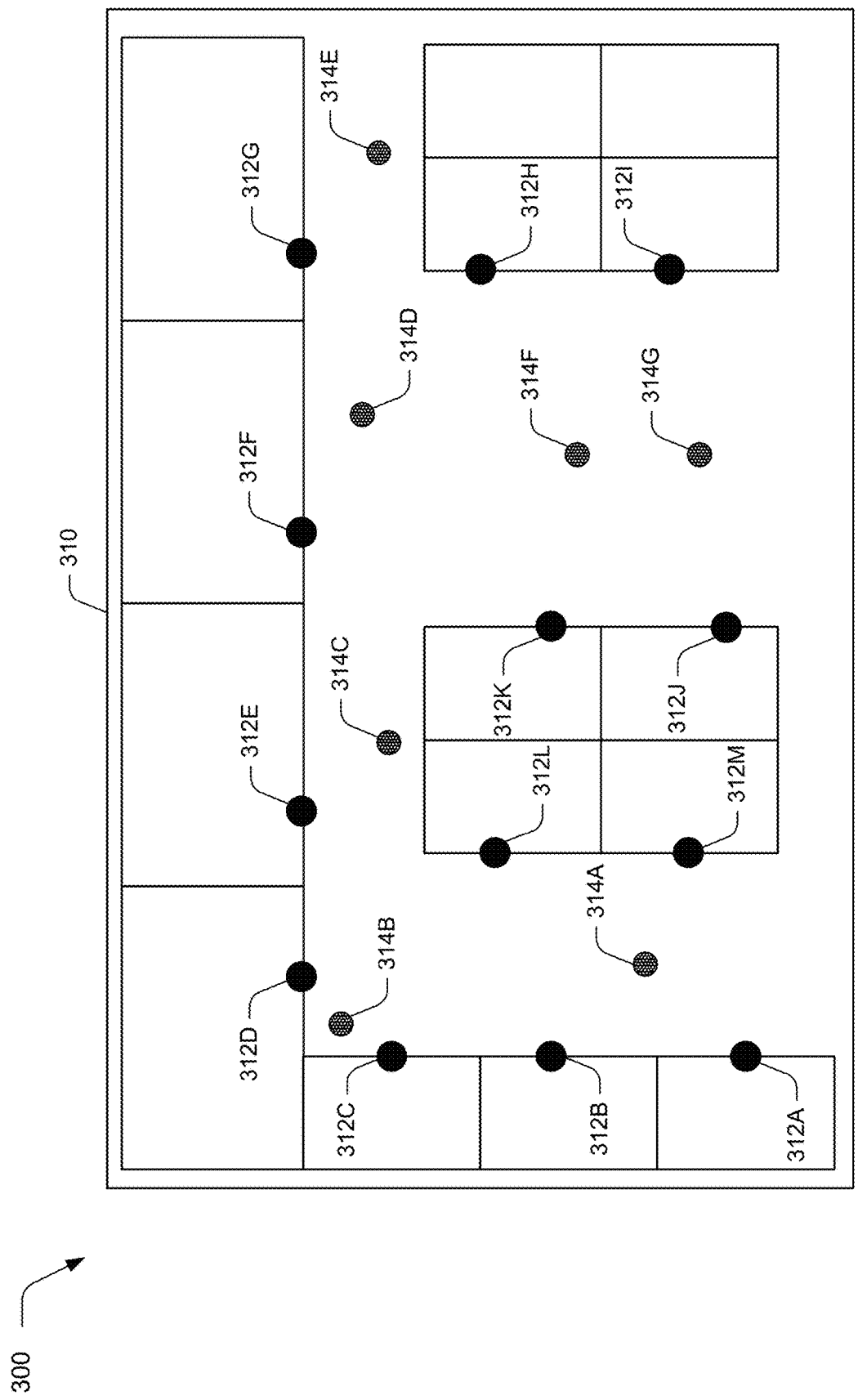
FIGS. 3A, 3B, 3C, 3D, and 3E illustrate an example of generating indications of a traversable path to a destination in a physical environment.
Figure 3B:
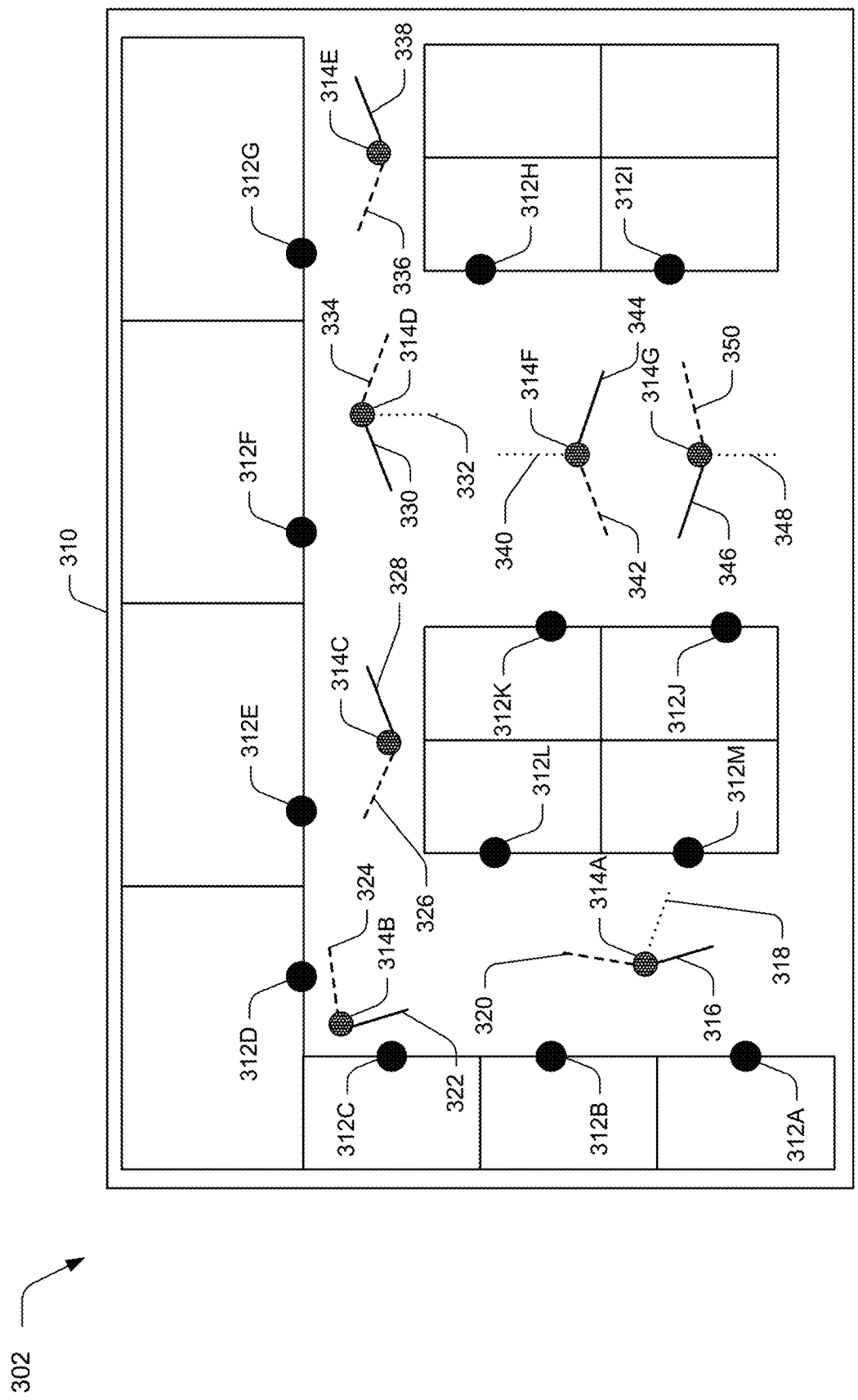
Figure 3C:
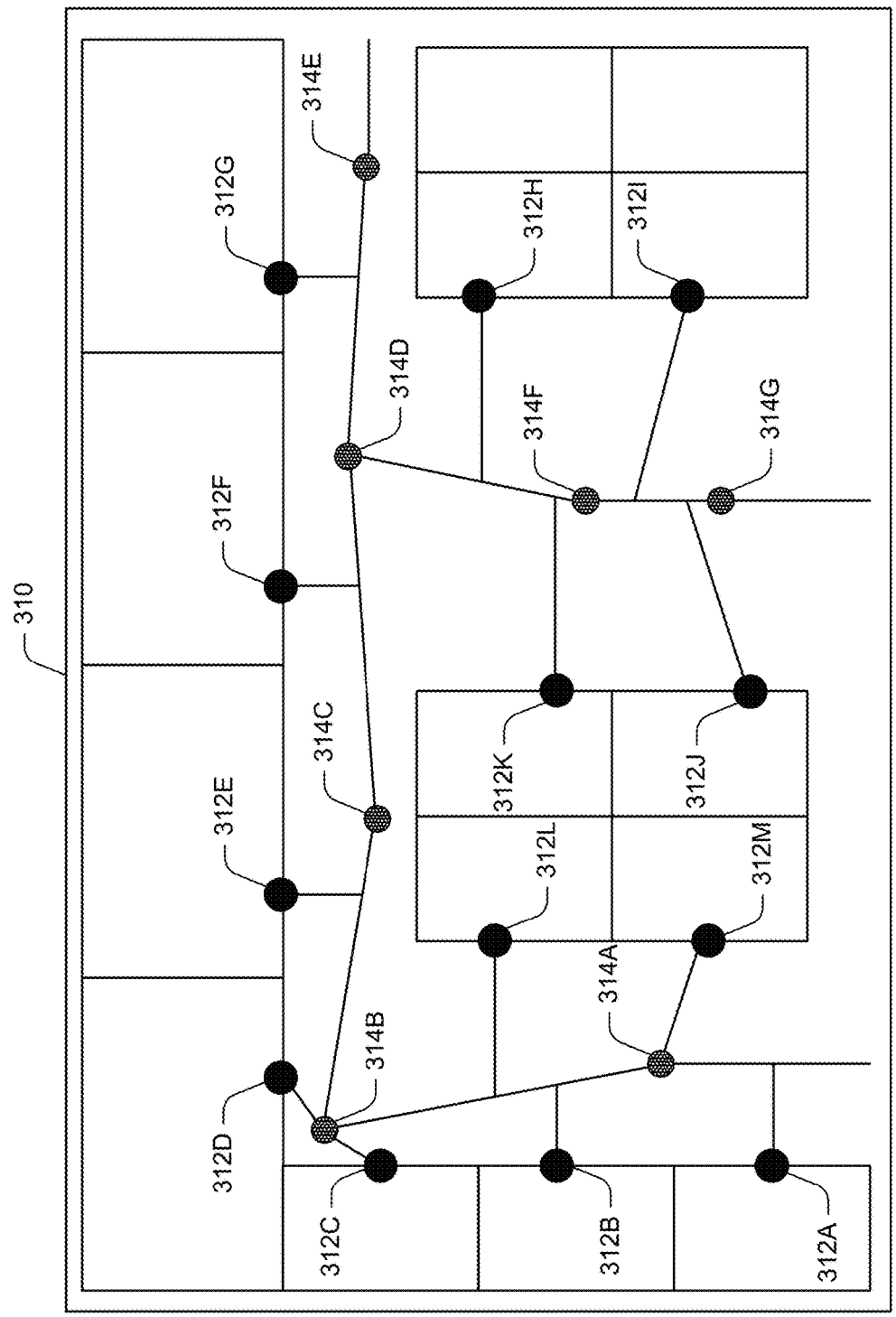
Figure 3D:
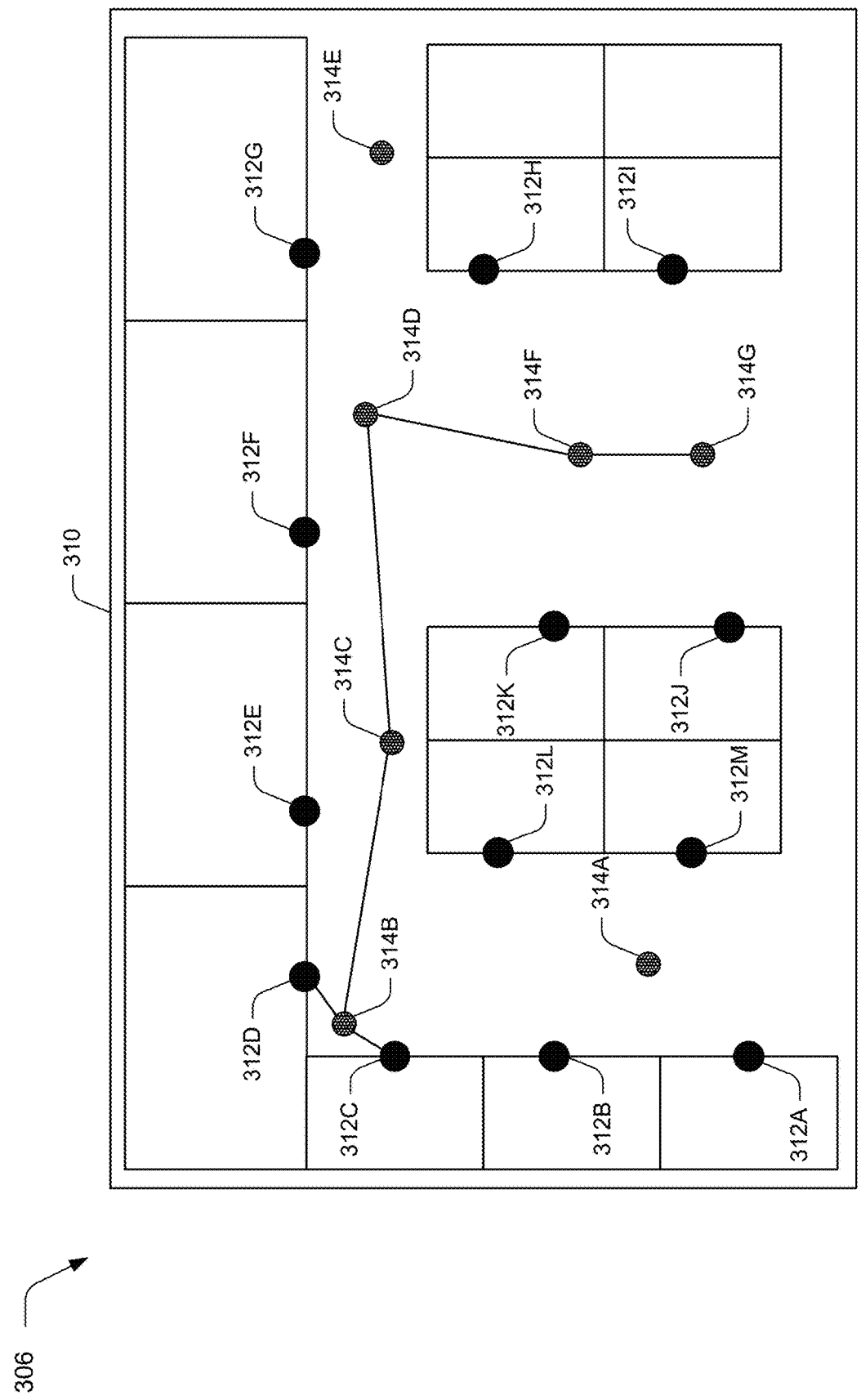
Figure 3E:
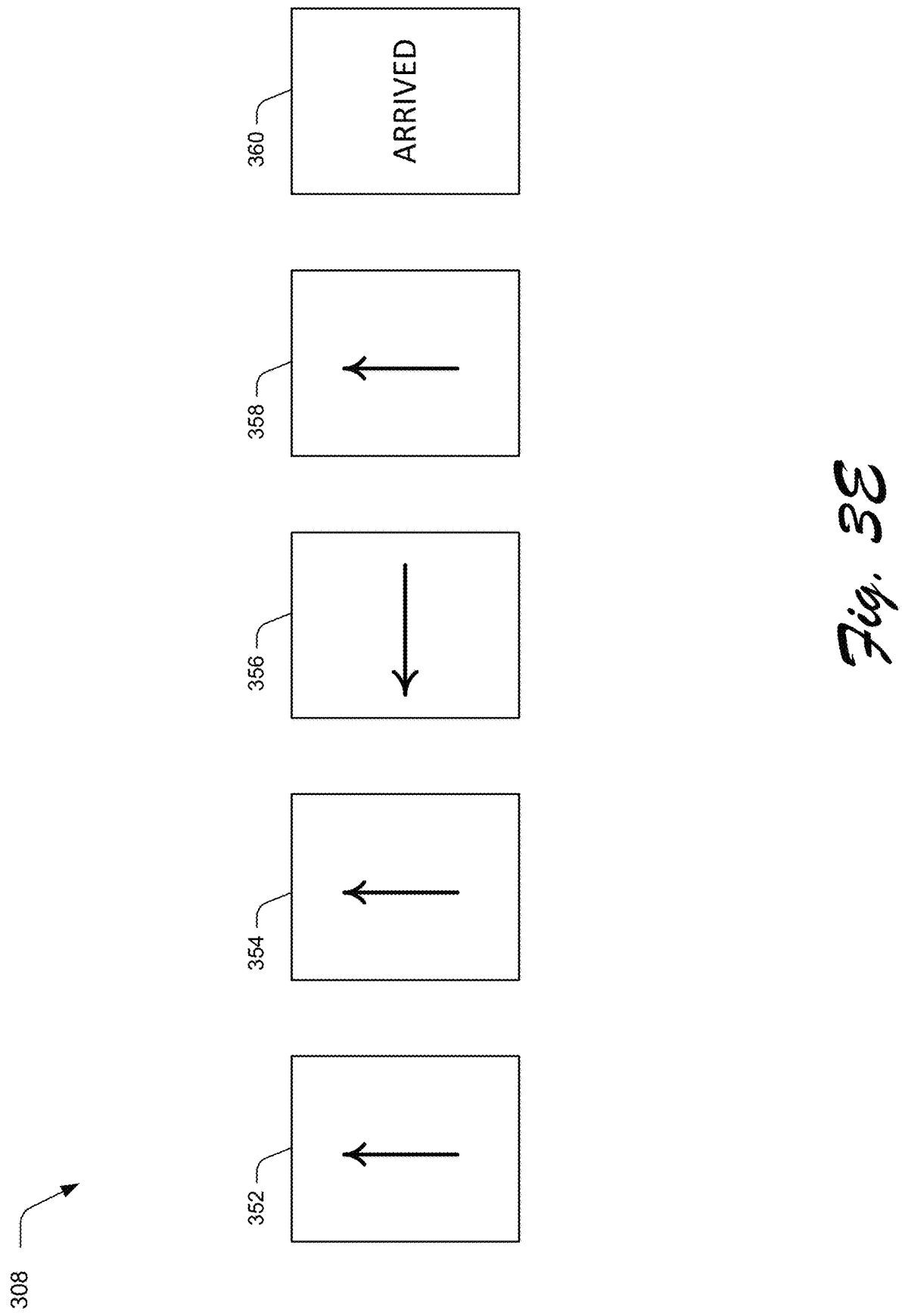

FIG. 2 depicts a system 200 in an example implementation showing operation of a navigation module 122. The navigation module 122 is illustrated to include a graph module 202, a path module 204, and a display module 206. In the illustrated example, the navigation module 122 receives the device data 130, the map data 124, and the request data 126; however, in other examples the navigation module 122 is capable of generating the map data 124. FIGS. 3A, 3B, 3C, 3D, and 3E illustrate an example of generating indications of a traversable path to a destination in a physical environment. FIG. 3A illustrates a representation 300 of a physical environment. FIG. 3B illustrates a representation 302 of indicated orientations of display devices in the physical environment. FIG. 3C illustrates a representation 304 of a connected graph of display devices and destinations in the physical environment. FIG. 3D illustrates a representation 306 of a traversable path to a destination in the physical environment. FIG. 3E illustrates a representation 308 of example indications of the traversable path which are displayable by display devices along the traversable path.

With respect to FIGS. 2 and 3A, the map data 124 describes a physical environment 310 which includes destinations 312A-312M as well as display devices 314A-314G. In one example, the map data 124 is generated by annotating a map of the physical environment 310 to indicate locations of the destinations 312A-312M and the display devices 314A-314G in the physical environment 310. The display devices 314A-314G are capable of ranging from full resource devices with substantial memory and processor resources to low-resource devices with limited memory and/or processing resources. In a low-resource device example, the display devices 314A-314G include arrays of light emitting diodes. In a full resource device example, the display devices 314A-314G include digital kiosks. In one example, some of the display devices 314A-314G are arrays of light emitting diodes and some of the display devices 314A-314G are digital kiosks.

For example, the navigation module 122 generates the map data 124 using a map of the physical environment 310 if the map is available to the navigation module 122. In another example, the navigation module 122 generates a map of the physical environment 310 by determining locations of each of the destinations 312A-312M and each of the display devices 314A-314G in the physical environment 310. The navigation module 122 is capable of generating the map of the physical environment 310 using a variety of different techniques such as capturing a digital photograph of the physical environment 310 or capturing a digital photograph of a map of the physical environment 310. In some examples, the navigation module 122 receives the map data 124 which describes the annotated map of the physical environment 310.

In one example, the device data 130 describes locations of the display devices 314A-314G. In this example, each of the display devices 314A-314G includes an image capture device and one or more sensors such as orientation sensors, acceleration sensors, position sensors, and so forth. For example, the display devices 314A-314G generate three-dimensional scene data describing the physical environment 310 through use of visual inertial odometry by estimating orientation and translation in response to movements of the image capture devices relative to the physical environment 310. This three-dimensional scene data describes locations of each of the destinations 312A-312M and each of the display devices 314A-314G in the physical environment 310. In one example, the navigation module 122 receives the device data 130 which includes the three-dimensional scene data and the navigation module 122 processes the three-dimensional scene data to generate the map data 124.

Consider an example in which the navigation module 122 receives the map data 124 based on user inputs indicating the locations of each of the destinations 312A-312M and each of the display devices 314A-314G in the physical environment 310. In this example, a user interacts with a user interface of the computing device 102 to indicate locations of the display devices 314A-314G and locations of the destinations 312A-312M in the physical environment 310. The navigation module 122 module generates the map data 124 based on the indicated locations of the destinations 312A-312M and the display devices 314A-314G in the physical environment 310.

As shown in FIG. 2, the graph module 202 receives the map data 124 which describes the locations of the display devices 314A-314G and locations of the destinations 312A-312M in the physical environment 310, and the graph module 202 processes the map data 124 to generate graph data 208. To do so, the graph module 202 indicates relative orientations of the display devices 314A-314G in the physical environment 310. In one example, the graph module 202 generates the indications of the orientations of the display devices 314A-314G as line segments extending from each of the display devices 314A-314G. For example, each line segment corresponds to a viable direction of travel in the physical environment 310.

As illustrated in FIG. 3B, display device 314A is associated with viable directions of travel 316-320. Viable direction of travel 316 is down, viable direction of travel 318 is right, and viable direction of travel 320 is up. Display device 314B is associated with viable directions of travel 322, 324. As shown, viable direction of travel 322 is down and viable direction of travel 324 is right. Display device 314C is associated with viable direction of travel 326 which is left and viable direction of travel 328 which is right.

Display device 314D is associated with viable directions of travel 330-334. Viable direction of travel 330 is left, viable direction of travel 332 is down, and viable direction of travel 334 is right. Display device 314E is associated with viable directions of travel 336, 338. Viable direction of travel 336 is left and viable direction of travel 338 is right. Display device 314F is associated with viable direction of travel 340 which is up, viable direction of travel 342 which is left, and viable direction of travel 344 which is right. As shown, display device 314G is associated with viable directions of travel 346-350. Viable direction of travel 346 is left, viable direction of travel 348 is down, and viable direction of travel 350 is right.

For example, the graph module 202 connects the viable directions of travel 316-350, the destinations 312A-312M, and the display devices 314A-314G to form a single connected graph or a navigation graph which is illustrated in FIG. 3C. As shown, the graph includes a traversable path to each of the destinations 312A-312M in the physical environment 310. The graph module 202 generates the graph data 208 as describing the connected graph.

In an example, the graph module 202 also determines a shortest traversable path from each of the display devices 314A-314G to each of the destinations 312A-312M in the physical environment 310 using the connected graph. In one example, the graph module 202 determines the shortest traversable paths using Dijkstra's algorithm In another example, the graph module 202 determines the shortest traversable paths using any suitable technique. For example, the graph module 202 applies weights to edges of the graph that correspond to distances of traversable paths in the physical environment 310 represented by the edges. In this example, the graph module 202 determines the shortest traversable paths using Dijkstra's algorithm based on the weights of the edges of the graph.

In one example, the graph module generates the graph data 208 as describing the connected graph and the shortest traversable paths from each of the display devices 314A-314G to each of the destinations 312A-312M in the physical environment 310. The path module 204 receives the graph data 208 and the request data 126 and processes the graph data 208 and/or the request data 126 to generate path data 128. For example, the request data 126 describes a request for a navigation to destination 312C and/or destination 312D which is adjacent to the destination 312C in the physical environment 310. The path module 204 determines a traversable path to the destination 312C and/or the destination 312D which is illustrated in FIG. 3D. In one example, the traversable path to the destination 312C and/or the destination 312D is a shortest traversable path to the destination 312C and/or the destination 312D. In another example, the traversable path to the destination 312C and/or the destination 312D is not a shortest traversable path to the destination 312C and/or the destination 312D. The path module 204 generates the path data 128 as describing the traversable path to the destination 312C and/or the destination 312D.

The display module 206 receives the path data 128 and processes the path data 128 to generate indications of the traversable path for display by display devices 314G, 314F, 314D, 314C, and 314B which are illustrated in FIG. 3E. For example, a user enters the physical environment 310 and the display device 314G displays an indication 352 of the traversable path. The indication 352 is a directional indication which is an arrow pointing up in one example. The user proceeds in the direction indicated by the indication 352 and observes that the display device 314F is displaying an indication 354 which is also an arrow pointing up. The user proceeds in a direction indicated by the display device 314F and approaches the display device 314D which displays an indication 356. The indication 356 is a directional indication which is an arrow pointing left. The user proceeds in the direction indicated by the indication 356 and approaches the display device 314C. The display device 314C is displaying an indication 358 which is an arrow pointing up in an example. The user proceeds in the direction indicated by the indication 358 and approaches the display device 314B. The display device 314B displays an indication 360 which indicates that the user has arrived at the destination 312C and/or the destination 312D. For example, the indication 360 is the word "arrived" in the illustrated example. In other examples, the indication 360 is a pulsing green square or a checkmark which indicates to the user that the user has arrived at the destination 312C and/or the destination 312D.

Although the indications 352-358 are describes as directional indications, it is to be appreciated that the described systems are not limited to directional indications. For example, the navigation module 122 is capable of generating the indications 352-358 as textual indications, audio indications, tactile indications, and so forth. In other examples, the navigation module 122 generates the indications 352-358 to include animations, shapes, colors, textual information, and/or textual instructions.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
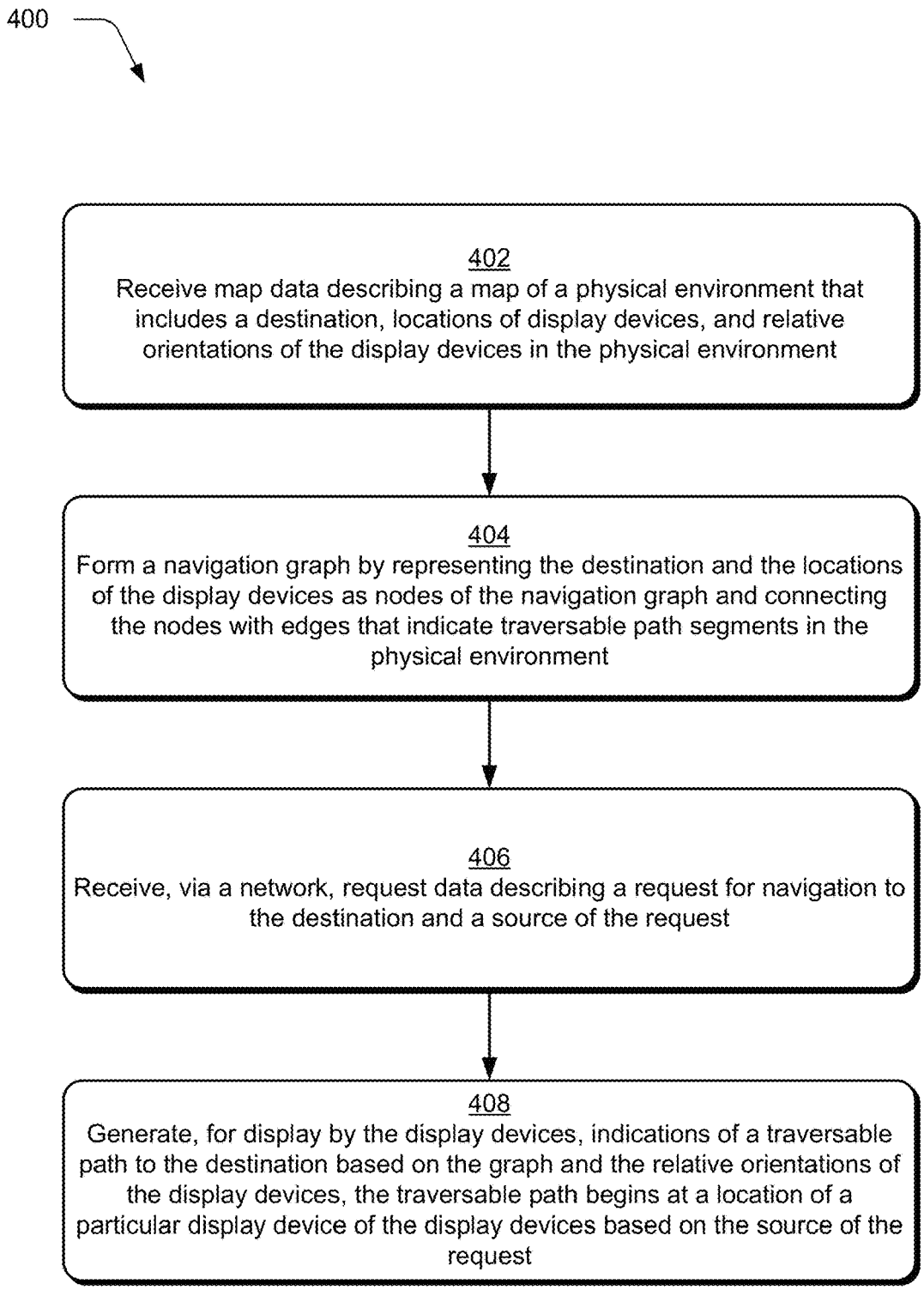
FIG. 4 is a flow diagram depicting a procedure in an example implementation in which request data describing a request for navigation to a destination is received and indications of a traversable path to the destination are generated.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which request data describing a request for navigation to a destination is received and indications of a traversable path to the destination are generated.

Map data is received describing a map of a physical environment that includes a destination, locations of display devices in the physical environment, and relative orientations of the display devices in the physical environment (block 402). The computing device 102 implements the navigation module 122 to receive the map data in one example. A navigation graph is formed (block 404) by representing the destination and the locations of the display devices as nodes of the navigation graph and connecting the nodes with edges that indicate traversable path segments in the physical environment. For example, the navigation module 122 forms the navigation graph.

Request data is received, via a network, describing a request for navigation to the destination and a source of the request (block 406). In one example, the computing device 102 implements the navigation module 122 to receive the request data. Indications of a traversable path to the destination are generated for display by the display devices based on the navigation graph and the relative orientations of the display devices, the traversable path begins at a location of a particular display device of the display devices based on the source of the request (block 408). The navigation module 122 generates the indications of the traversable path to the destination in one example.

Figure 5:
FIG. 5 illustrates an example representation of a user interface of a control server.

FIG. 5 illustrates an example representation 500 of a user interface of a control server. In one example, the control server represents the computing device 102. In another example, the control server represents one of the display devices 314A-314G. As shown, the representation of the user interface of the control server includes user interface elements 502-506 which each correspond to one of the destinations 312A-312M of the physical environment 310. For example, user interface element 502 corresponds to the destination 312A, user interface element 504 corresponds to the destination 312B, and user interface element 506 corresponds to the destination 312C.

Consider an example in which the control server represents the display device 314G. In this example, a user interacts with the user interface to select the user interface element 506 which corresponds to a request for navigation to the destination 312C. The display device 314G causes display devices 314F, 314D, 314C, and 314B to display indications of a traversable path to the destination 312C in the physical environment 310. In one example, the display device 314G communicates data directly to the display devices 314F, 314D, 314C, and 314B via a mesh network to cause the display devices 314F, 314D, 314C, and 314B to display indications of the traversable path to the destination 312C in the physical environment 310. In another example, the display device 314G communicates data to the navigation module 122 and the navigation module 122 causes the display devices 314F, 314D, 314C, and 314B to display indications of the traversable path to the destination 312C in the physical environment 310. The user follows the indications displayed and arrives at the destination 312C.

Consider another example in which the control server represents the display device 314G. In this example, the user interacts with the user interface to select the user interface element 502 which corresponds to a request for navigation to the destination 312A. The display device 314G causes display devices 314F, 314D, 314C, 314B, and 314A to display indications of a traversable path to the destination 312A in the physical environment 310. The user deviates from the traversable path in this example. For example, the display device 314D displays an arrow pointing left and user proceeds in a right direction towards the display device 314E.

Continuing this example, the display device 314E determines that the user has deviated from the traversable path. For example, a sensor of the display device 314E detects the user's movement and based on this detected movement, the display device 314E determines that the user is not following the traversable path. The display device 314E displays an indication of a deviation from the traversable path, for example, the display device 314E displays an indication which is an arrow pointing in a direction opposite of a direction in which the user is proceeding. The user observes the indication of the deviation from the traversable path, turns around, and follows indications of the traversable path displayed by the display devices 314D, 314C, 314B, and 314A and arrives at the destination 312A in the physical environment 310.

Consider an example in which the described systems are robust to user deviations from the traversable path. In this example, the traversable path is a shortest path to the destination 312A in the physical environment 310 based on locations of the display devices 314F, 314D, 314C, 314B, and 314A in the physical environment 310. Continuing this example, any indication displayed by any of the display devices 314F, 314D, 314C, 314B, and 314A guides a user to the destination 312A. For example, the user does not identify an indication displayed by the display device 314D, the user returns to the display device 314F which displays an indication of the traversable path to the destination 312A in the physical environment 310.

Figure 6:
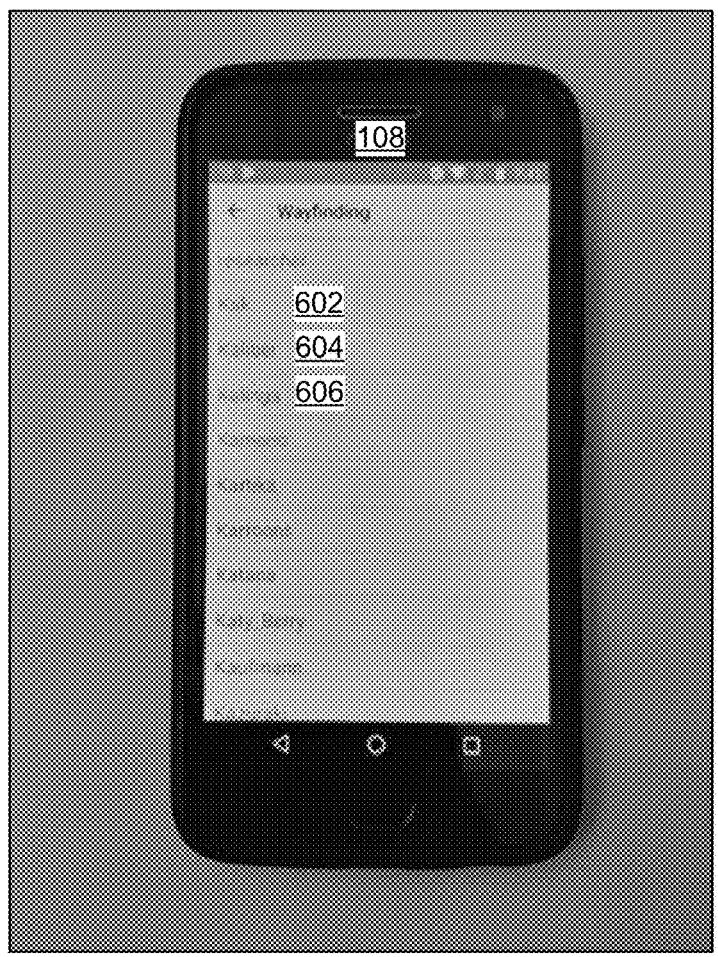
FIG. 6 illustrates an example representation of a user interface of an application of a remote computing device.

FIG. 6 illustrates an example representation 600 of a user interface of an application of a remote computing device 108. As illustrated, the user interface includes user interface elements 602-606. Each of the user interface elements 602-606 corresponds to one of the destinations 312A-312M in the physical environment 310. In one example, user interface element 602 corresponds to the destination 312A, user interface element 604 corresponds to the destination 312B, and user interface element 606 corresponds to the destination 312C.

For example, a user of the remote computing device 108 interacts with the user interface to select the user interface element 604 which corresponds to a request for navigation to the destination 312B in physical environment 310. Responsive to selection of the user interface element 604, the remote computing device 108 transmits request data 126 to the computing device 102 via the network 104. In this example, the request data 126 describes the request for navigation to the destination 312B.

The navigation module 122 processes the request data 126 and generates path data 128 that describes a traversable path to the destination 312B in the physical environment. The computing device 102 transmits the path data 128 to the physical environment 310 via the network 104 which causes display devices 314G, 314F, 314D, 314C, and 314B to display indications of the traversable path to the destination 312B. In this example, the user proceeds along the traversable path by following directions displayed by the display devices 314G, 314F, 314D, 314C, and 314B and arrives at the destination 312B.

Although the user interface is described with respect to the remote computing device 108, it is to be appreciated that the user interface is also representative of an example user interface of some or all of the display devices 314A-314G. For example, rather than interacting with the user interface of the remote computing device 108 to select the user interface element 604, a user interacts with a user interface of display device 314G to select the user interface element 604. In this example, the display device 314G transmits request data 126 to the computing device 102 via the mesh network and the computing device 102 transmits the path data 128 to the physical environment 310 via the network 104 which causes display devices 314G, 314F, 314D, 314C, and 314B to display indications of the traversable path to the destination 312B.

Evaluation Example

The described systems were evaluated in an experiment in which 18 participants were asked to navigate an unfamiliar physical space to reach a particular destination in the physical space. Traversable paths to the particular destination in the physical space were varied by complexity as simple or complex. A density of display devices along the traversable paths was also varied between display device densities of none, low, and high. The participants were evaluated based on walking speed along the traversable paths. Based on this metric, the participants performed better under conditions high densities of display devices than under conditions of low densities of display devices. The participants performed best under conditions of high densities of display devices and complex paths. Excluding conditions with no display devices, the participants performed worst under conditions of low densities of display devices and complex paths.

Example System and Device

Figure 7:
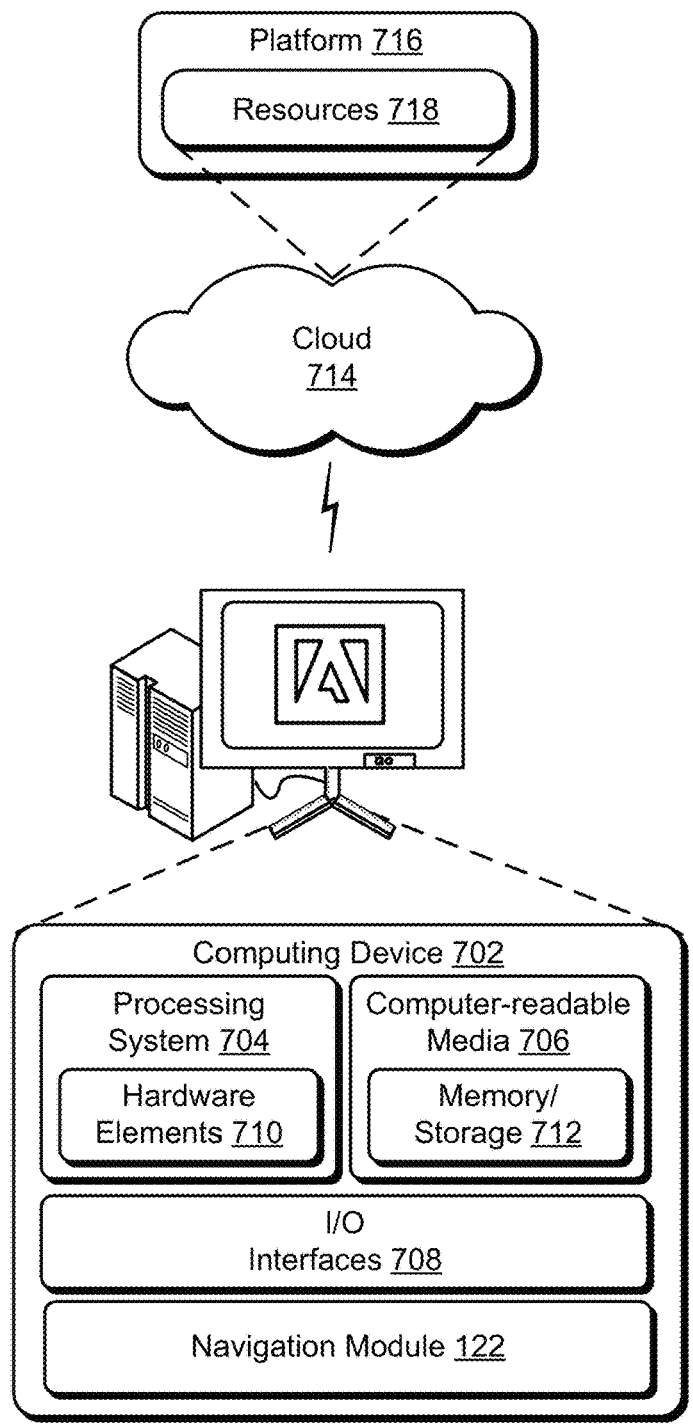
FIG. 7 illustrates an example system that includes an example computing device that is representative of one or more computing systems and/or devices for implementing the various techniques described herein.

FIG. 7 illustrates an example system 700 that includes an example computing device that is representative of one or more computing systems and/or devices that are usable to implement the various techniques described herein. This is illustrated through inclusion of the navigation module 122. The computing device 702 includes, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. The memory/storage 712 represents memory/storage capacity associated with one or more computer-readable media. In one example, the memory/storage component 712 includes volatile media (such as random access memory (RAM)) and/or nonvolatile media (such as read only memory (ROM), Flash memory, optical disks, magnetic disks, and so forth). In another example, the memory/storage component 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through use of a distributed system, such as over a "cloud" 714 as described below.

The cloud 714 includes and/or is representative of a platform 716 for resources 718. The platform 716 abstracts underlying functionality of hardware (e.g., servers) and software resources of the cloud 714. For example, the resources 718 include applications and/or data that are utilized while computer processing is executed on servers that are remote from the computing device 702. In some examples, the resources 718 also include services provided over the Internet and/or through a subscriber network, such as a cellular or Wi-Fi network.

The platform 716 abstracts the resources 718 and functions to connect the computing device 702 with other computing devices. In some examples, the platform 716 also serves to abstract scaling of resources to provide a corresponding level of scale to encountered demand for the resources that are implemented via the platform. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

CONCLUSION

Although implementations of systems for generating indications of traversable paths have been described in language specific to structural features and/or methods, it is to be understood that the appended claims are not necessarily limited to the specific features or methods described. Rather, the specific features and methods are disclosed as example implementations of systems for generating indications of traversable paths, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device, map data describing a map of a physical environment that includes a destination, locations of display devices associated with viable directions of travel, relative orientations of the display devices in the physical environment, and spatial relationships between physical features in the physical environment;
forming, by the processing device, a navigation graph by representing the destination and the locations of the display devices as nodes of the navigation graph and connecting the nodes with edges that indicate traversable path segments in the physical environment based on the viable directions of travel and the spatial relationships between physical features in the physical environment;
receiving, by the processing device, via a network, request data describing a request for navigation to the destination and a source of the request;
determining, by the processing device, that a first display device is a particular display device to begin a traversable path if the source of the request is from inside the physical environment;
determining, by the processing device, that a second display device adjacent to an entrance to the physical environment is the particular display device to begin the traversable path if the source of the request is from outside the physical environment;
generating, by the processing device for display by the display devices, indications of the traversable path to the destination that is not a shortest path from a location of the particular display device to the destination, based on the navigation graph and the relative orientations of the display devices, the traversable path begins at a location of the particular display device of the display devices based on the source of the request;

generating, by the processing device for display by the display devices, an indication of a destination arrival time based on the source of the request, the destination, and the navigation graph;

monitoring, by the processing device, a progress of a user along the traversable path by leveraging an order in which the display devices communicate sensor data describing detected motion;

detecting, by the processing device, an additional user along the traversable path;

generating, by the processing device for display by the display devices, an indication of a deviation from the traversable path in response to detecting the additional user;

updating, by the processing device, the destination arrival time based on the deviation from the traversable path;

updating, by the processing device, the indications of the traversable path based on the progress of the user detecting, by the processing device, an arrival at the destination by the user; and generating, by the processing device for display by the display devices, indications of an exit path from the destination that prevents physical interaction between the user and the additional user.

2. The method as described in claim 1, wherein the edges of the navigation graph include weights corresponding to distances of the traversable path segments in the physical environment.

3. The method as described in claim 2, wherein the traversable path is based on the weights.

4. The method as described in claim 1, wherein the indications of the traversable path are directional indications describing the traversable path.

5. The method as described in claim 1, wherein the particular display device is not located at a pre-assigned physical location.

6. The method as described in claim 1, wherein the source of the request is a remote computing device.

7. The method as described in claim 1, further comprising:
receiving sensor data from sensors of the display devices; and
determining a particular indication of the indications for display by an additional particular display device of the display devices based on the sensor data.

8. The method as described in claim 7, wherein the particular indication is an indication of an arrival at the destination.

9. The method as described in claim 1, wherein the indications of the traversable path indicate a delay in navigation.

10. A system comprising:
a memory component; and
a processing device coupled to the memory component, the processing device to perform operations comprising:
receiving map data describing a map of a physical environment that includes destinations in the physical environment, locations of display devices associated with viable directions of travel in the physical environment, relative orientations of the display devices in the physical environment, and spatial relationships between physical features in the physical environment;

forming a navigation graph by representing the destinations and the locations of the display devices as nodes of the navigation graph and connecting the nodes with edges that indicate traversable path segments in the physical environment based on the viable directions of travel and the spatial relationships between physical features in the physical environment;

receiving, via a network, request data describing a request for navigation to a particular destination of the destinations and a source of the request;

determining that a first display device is a particular display device to begin a traversable path if the source of the request is from inside the physical environment;

determining that a second display device adjacent to an entrance to the physical environment is the particular display device to begin the traversable path if the source of the request is from outside the physical environment;

determining the traversable path to the particular destination that is not a shortest path from a location of the particular display device to the destination in the physical environment based on the navigation graph and the relative orientations of the display devices;

generating indications of the traversable path for display by the display devices in the physical environment;

generating, for display by the display devices, an indication of a destination arrival time based on the source of the request, the destination, and the navigation graph;

monitoring a progress of a user along the traversable path by leveraging an order in which the display devices communicate sensor data describing detected motion;

detecting an additional user along the traversable path;

generating, for display by the display devices, an indication of a deviation from the traversable path in response to detecting the additional user;

updating the destination arrival time based on the deviation from the traversable path;

updating the indications of the traversable path based on the progress of the user detecting an arrival at the destination by the user; and generating, for display by the display devices, indications of an exit path from the destination that prevents physical interaction between the user and the additional user.

11. The system as described in claim 10, wherein the edges of the navigation graph include weights corresponding to distances of the traversable path segments in the physical environment and the traversable path is based on the weights.

12. The system as described in claim 10, wherein the request data is received from a display device of the display devices or a remote computing device.

13. The system as described in claim 10, wherein each of the display devices includes a light emitting diode array and the indications of the traversable path are directional indications describing the traversable path.

14. The system as described in claim 10, further comprising receiving device data from the display devices and determining a particular indication of the indications for display by a particular display device of the display devices based on the device data.

15. The system as described in claim 10, further comprising:
receiving sensor data from sensors of the display devices; and
determining a particular indication of the indications for display by an additional particular display device of the display devices based on the sensor data.

16. One or more computer-readable storage media comprising instructions stored that, responsive to execution by a processing device, causes the processing device to perform operations including:
receiving map data describing a map of a physical environment that includes a destination, locations of display devices associated with viable directions of travel, relative orientations of the display devices in the physical environment, and spatial relationships between physical features in the physical environment;
forming a navigation graph by representing the destination and the locations of the display devices as nodes of the navigation graph and connecting the nodes with edges that indicate traversable path segments in the physical environment based on the viable directions of travel and the spatial relationships between physical features in the physical environment;
receiving, via a network, request data describing a request for navigation to the destination and a source of the request;
determining that a first display device is a particular display device to begin a traversable path if the source of the request is from inside the physical environment;
determining that a second display device adjacent to an entrance to the physical environment is the particular display device to begin the traversable path if the source of the request is from outside the physical environment;
generating, for display by the display devices, indications of the traversable path to the destination that is not a shortest path from a location of the particular display device to the destination, based on the navigation graph and the relative orientations of the display devices, the traversable path begins at a location of the particular display device of the display devices based on the source of the request;
generating, for display by the display devices, an indication of a destination arrival time based on the source of the request, the destination, and the navigation graph;
monitoring a progress of a user along the traversable path by leveraging an order in which the display devices communicate sensor data describing detected motion;
detecting an additional user along the traversable path;
generating, for display by the display devices, an indication of a deviation from the traversable path in response to detecting the additional user;
updating the destination arrival time based on the deviation from the traversable path;
updating the indications of the traversable path based on the progress of the user
detecting an arrival at the destination by the user; and
generating, for display by the display devices, indications of an exit path from the destination that prevents physical interaction between the user and the additional user.

17. The one or more computer-readable storage media as described in claim 16, wherein the operations further include:
receiving sensor data from sensors of the display devices; and
determining a particular indication of the indications for display by an additional particular display device of the display devices based on the sensor data.

18. The one or more computer-readable storage media as described in claim 16, wherein the particular display device is not located at a pre-assigned physical location.

19. The one or more computer-readable storage media as described in claim 16, wherein the edges of the navigation graph include weights corresponding to distances of the traversable path segments in the physical environment and the traversable path is based on the weights.

20. The one or more computer-readable storage media as described in claim 16, wherein the indications of the traversable path are directional indications describing the traversable path.

* * * * *